(12) United States Patent
Koningstein

(10) Patent No.: US 8,838,479 B2
(45) Date of Patent: Sep. 16, 2014

(54) SYSTEM AND METHOD FOR ENABLING AN ADVERTISEMENT TO FOLLOW THE USER TO ADDITIONAL WEB PAGES

(75) Inventor: Ross Koningstein, Menlo Park, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/073,945

(22) Filed: Mar. 28, 2011

(65) Prior Publication Data

US 2011/0238508 A1 Sep. 29, 2011

Related U.S. Application Data

(63) Continuation of application No. 10/748,681, filed on Dec. 31, 2003, now Pat. No. 7,930,206.

(60) Provisional application No. 60/516,281, filed on Nov. 3, 2003.

(51) Int. Cl.
  *G06Q 30/00* (2012.01)
  *G06Q 30/02* (2012.01)
  *G06Q 10/10* (2012.01)

(52) U.S. Cl.
  CPC ............ *G06Q 10/10* (2013.01); *G06Q 30/0246* (2013.01); *G06Q 30/0272* (2013.01); *G06Q 30/0277* (2013.01); *G06Q 30/0241* (2013.01)
  USPC ...................................................... 705/14.73

(58) Field of Classification Search
  CPC .... G06Q 30/02; G06Q 50/01; G06Q 30/0277
  USPC .................................... 705/14; 715/526, 500
  See application file for complete search history.

(56) References Cited

U.S. PATENT DOCUMENTS

| 5,636,346 | A | 6/1997 | Saxe |
| 5,724,521 | A | 3/1998 | Dedrick et al. |
| 5,845,265 | A | 12/1998 | Woolston |
| 5,918,010 | A | 6/1999 | Appleman et al. |
| 5,920,854 | A | 7/1999 | Kirsch et al. |
| 5,931,901 | A | 8/1999 | Wolfe et al. |
| 5,974,398 | A | 10/1999 | Hanson et al. |

(Continued)

FOREIGN PATENT DOCUMENTS

| EP | 1026610 A2 | 8/2000 |
| KR | 10-2001-0102648 | 11/2001 |

(Continued)

OTHER PUBLICATIONS

Korean Office Action dated Apr. 11, 2011 from related Korean Patent Application No. 10-2006-7010729, 8 pages.

(Continued)

*Primary Examiner* — William A Brandenburg
(74) *Attorney, Agent, or Firm* — Fish & Richardson P.C.

(57) ABSTRACT

A computer-implemented method and system for advertising that performs the steps of delivering an electronic advertisement comprising one or more menu options and a reference to a network location for retrieving specified content associated with each menu option for inclusion in a first electronic document, receiving a selection of one or more menu options from the electronic advertisement and delivering a subsequent accessible document including content from the referenced network location associated with the menu option selected, the subsequent accessible document including the electronic advertisement.

30 Claims, 12 Drawing Sheets

(56) References Cited

U.S. PATENT DOCUMENTS

| | | |
|---|---|---|
| 6,026,368 A | 2/2000 | Brown |
| 6,044,375 A | 3/2000 | Shmueli et al. |
| 6,061,659 A | 5/2000 | Murray |
| 6,067,570 A | 5/2000 | Kreynin et al. |
| 6,078,866 A | 6/2000 | Buck et al. |
| 6,182,068 B1 | 1/2001 | Culliss |
| 6,223,163 B1 | 4/2001 | Van Luchene |
| 6,230,170 B1 | 5/2001 | Zellweger et al. |
| 6,243,104 B1 | 6/2001 | Murray |
| 6,247,009 B1 | 6/2001 | Shiiyama et al. |
| 6,253,189 B1 | 6/2001 | Feezell et al. |
| 6,269,361 B1 | 7/2001 | Davis et al. |
| 6,271,840 B1 | 8/2001 | Finseth et al. |
| 6,285,987 B1 | 9/2001 | Roth et al. |
| 6,298,348 B1 | 10/2001 | Eldering |
| 6,313,855 B1 | 11/2001 | Shuping et al. |
| 6,324,519 B1 | 11/2001 | Eldering |
| 6,336,132 B2 | 1/2002 | Appleman et al. |
| 6,421,675 B1 | 7/2002 | Ryan et al. |
| 6,826,572 B2 | 11/2004 | Colace et al. |
| 7,035,812 B2 | 4/2006 | Meisel et al. |
| 7,058,593 B1 | 6/2006 | Merritt |
| 7,490,288 B2 | 2/2009 | Undasan |
| 7,668,748 B1 | 2/2010 | Veach |
| 7,778,872 B2 | 8/2010 | Kamangar et al. |
| 7,792,698 B1 | 9/2010 | Veach et al. |
| 7,818,207 B1 | 10/2010 | Veach |
| 7,844,493 B1 | 11/2010 | Veach et al. |
| 2001/0042064 A1 | 11/2001 | Davis et al. |
| 2001/0047297 A1 | 11/2001 | Wen |
| 2001/0051911 A1 | 12/2001 | Marks et al. |
| 2002/0002509 A1 | 1/2002 | Wagorn et al. |
| 2002/0002525 A1 | 1/2002 | Arai et al. |
| 2002/0026359 A1 | 2/2002 | Long et al. |
| 2002/0032677 A1 | 3/2002 | Morgenthaler et al. |
| 2002/0035536 A1 | 3/2002 | Gellman |
| 2002/0038282 A1 | 3/2002 | Montgomery |
| 2002/0046099 A1 | 4/2002 | Frengut et al. |
| 2002/0046104 A1 | 4/2002 | Kaddeche et al. |
| 2002/0077891 A1 | 6/2002 | Castle et al. |
| 2002/0091570 A1 | 7/2002 | Sakagawa |
| 2002/0099605 A1 | 7/2002 | Weitzman et al. |
| 2002/0111898 A1 | 8/2002 | Numaoka et al. |
| 2002/0112033 A1 | 8/2002 | Doemling et al. |
| 2002/0113815 A1 | 8/2002 | DeGross |
| 2002/0123988 A1 | 9/2002 | Dean et al. |
| 2002/0126813 A1 | 9/2002 | Partovi et al. |
| 2002/0163545 A1 | 11/2002 | Hii |
| 2002/0165767 A1 | 11/2002 | Ogura et al. |
| 2002/0165773 A1 | 11/2002 | Natsuno et al. |
| 2002/0184097 A1 | 12/2002 | Hijiri et al. |
| 2002/0194062 A1 | 12/2002 | Linde |
| 2002/0198780 A1 | 12/2002 | Kawakami et al. |
| 2003/0037334 A1 | 2/2003 | Khoo et al. |
| 2003/0070167 A1 | 4/2003 | Holtz et al. |
| 2003/0083937 A1 | 5/2003 | Hasegawa et al. |
| 2003/0135460 A1 | 7/2003 | Talegon |
| 2003/0146939 A1* | 8/2003 | Petropoulos et al. ......... 345/810 |
| 2003/0149618 A1 | 8/2003 | Sender et al. |
| 2003/0163372 A1 | 8/2003 | Kolsy |
| 2003/0216963 A1 | 11/2003 | Ishiwaka et al. |
| 2003/0224340 A1 | 12/2003 | Housman et al. |
| 2004/0015397 A1 | 1/2004 | Barry et al. |
| 2004/0019523 A1 | 1/2004 | Barry et al. |
| 2004/0044571 A1 | 3/2004 | Bronnimann et al. |
| 2004/0054577 A1 | 3/2004 | Inoue et al. |
| 2004/0054589 A1 | 3/2004 | Nicholas et al. |
| 2004/0059708 A1 | 3/2004 | Dean et al. |
| 2004/0059712 A1 | 3/2004 | Dean et al. |
| 2004/0088241 A1 | 5/2004 | Rebane et al. |
| 2004/0093327 A1 | 5/2004 | Anderson et al. |
| 2004/0093620 A1 | 5/2004 | Iino et al. |
| 2004/0103024 A1 | 5/2004 | Patel et al. |
| 2004/0119740 A1 | 6/2004 | Chang et al. |
| 2004/0143499 A1 | 7/2004 | Dietsch et al. |
| 2004/0143843 A1 | 7/2004 | Khoo et al. |
| 2004/0167928 A1 | 8/2004 | Anderson et al. |
| 2004/0239703 A1 | 12/2004 | Angelica |
| 2004/0249709 A1 | 12/2004 | Donovan et al. |
| 2005/0065806 A1 | 3/2005 | Harik |
| 2005/0071224 A1 | 3/2005 | Fikes et al. |
| 2005/0076014 A1 | 4/2005 | Agarwal et al. |
| 2005/0096979 A1 | 5/2005 | Koningstein |
| 2005/0096980 A1 | 5/2005 | Koningstein |
| 2005/0114210 A1 | 5/2005 | Faber et al. |
| 2005/0131758 A1 | 6/2005 | Desikan et al. |
| 2005/0131762 A1 | 6/2005 | Bharat et al. |
| 2005/0144069 A1 | 6/2005 | Wiseman et al. |
| 2005/0216335 A1 | 9/2005 | Fikes et al. |
| 2005/0222900 A1 | 10/2005 | Fuloria et al. |
| 2005/0222903 A1 | 10/2005 | Buchheit et al. |
| 2005/0222989 A1 | 10/2005 | Haveliwala et al. |
| 2005/0223002 A1 | 10/2005 | Agarwal et al. |
| 2005/0235203 A1 | 10/2005 | Undasan |

FOREIGN PATENT DOCUMENTS

| | | |
|---|---|---|
| KR | 10-2002-0051922 | 6/2002 |
| KR | 10-2003-0043106 | 6/2003 |
| WO | 0038074 | 6/2000 |
| WO | 2004/042525 | 5/2004 |

OTHER PUBLICATIONS

Korean Office Action dated Apr. 11, 2011 from related Korean Patent Application No. 10-2006-7010731, 5 pages.
U.S. Appl. No. 10/112,656, filed Mar. 29, 2002.
U.S. Appl. No. 10/445,376, filed May 23, 2003.
Google Introduces New Pricing for Popular Self-Service Online Advertising Program, http://www.goggle.com/press/pressrel/select.html, p. 1-2, dated Feb. 20, 2002, printed on Jul. 29, 2003. (electronic copy on enclosed CD).
Collection of pages from www.overture.com, printed on Jul. 29, 2003. (electronic copy on enclosed CD).
Collection of pages from findwhat.com, http://www.findwhat.com, printed on Jul. 29, 2003 (electronic copy on enclosed CD).
Collection of pages from Sprinks.com, on enclosed http://www.sprinks.com, printed on Jul. 29, 2003 (electronic copy on enclosed CD).
Collection of pages from Kandoodle.com, http://www.kanoodle.com, printed on Jul. 29, 2003 (electronic copy on enclosed CD).
Collection of pages from Google Advertising, http://www.google.com, printed on Jul. 29, 2003 (electronic copy on enclosed CD).
Chris Sherman, "Google Launches AdWords Select," Feb. 20, 2002, 6 pages.
XP002456252, Statement in accordance with the Notice from the European Patent Office dated Oct. 1, 2007, Official Journal of the EPO, Nov. 2007, pp. 592-593, 594-600.
Supplementary European Search Report, Apr. 28, 2008.
USPTO, Non-Final Office Action, U.S. Appl. No. 10/748,681, mailed Apr. 16, 2008, 31 pages.
Fish & Richardson P.C., Amendment in Reply to Office Action dated Apr. 16, 2008 in U.S. Appl. No. 10/748,681, filed Aug. 18, 2008, 15 pages.
USPTO, Final Office Action, U.S. Appl. No. 10/748,681, mailed Oct. 16, 2008, 45 pages.
Fish & Richardson P.C., Amendment in Reply to Office Action dated Oct. 16, 2008 in U.S. Appl. No. 10/748,681, filed Jan. 8, 2009, 15 pages.
Fish & Richardson P.C., Request for Continued Examination filed Jan. 26, 2009 in U.S. Appl. No. 10/748,681, 1 page.
USPTO, Non-Final Office Action, U.S. Appl. No. 10/748,681, mailed Mar. 19, 2009, 57 pages.
Fish & Richardson P.C., Amendment in Reply to Office Action dated Mar. 19, 2009 in U.S. Appl. No. 10/748,681, filed May 12, 2009, 19 pages.
Fish & Richardson P.C., Restriction Requirement dated Oct. 8, 2008 in U.S. Appl. No. 10/748,682.
Fish & Richardson P.C., Response to Restriction Requirement dated Oct. 8, 2008 in U.S. Appl. No. 10/748,682, filed Nov. 7, 2008.

(56) References Cited

OTHER PUBLICATIONS

Fish & Richardson P.C., Non-final Office Action dated Apr. 2, 2009 in U.S. Appl. No. 10/748,682.

Fish & Richardson P.C., Response to Non-final Office Action dated Apr. 2, 2009 in U.S. Appl. No. 10/748,682, filed May 21, 2009.

Definition of "system", by foldoc.comm http://foldoc.org/index.cgi?query—system, downloaded Mar. 25, 2009 (1 page).

Definition of "instance", 2009, entry 4. In Merriam-Webster Online Dictionary. Retrieved Aug. 25, 2009, from http://merriam-webster.com/dictionary/instance.

USPTO, Final Office Action, U.S. Appl. No. 10/748,681, mailed Sep. 3, 2009, 72 pages.

Fish & Richardson P.C., Request for Continued Examination filed Nov. 13, 2009, in U.S. Appl. No. 10/748,681, 28 pages.

USPTO, Final Office Action, U.S. Appl. No. 10/748,682, mailed Oct. 16, 2009, 23 pages.

Fish & Richardson P.C., Request for Continued Examination filed Nov. 13, 2009 in U.S. Appl. No. 10/748,682, 28 pages.

U.S.P.T.O., Examiner Interview Summary, U.S. Appl. No. 10/748,682, mailed Mar. 26, 2010, 23 pages.

USPTO, Non-Final Office Action, U.S. Appl. No. 10/748,681, mailed Feb. 3, 2010, 53 pages.

"IAB, NAI Change Tactics on Ad Targeting", Mike Shields. Mediaweek. Apr. 15, 2010.

"NY Times online ad model mimics print", Kate Maddox. B to B. Chicago: Dec. 10, 2001. vol. 86, Iss. 22; p. 10, 1 pg.

Canadian Office Action dated Apr. 30, 2012 from related Canadian Patent Application No. 2,544,860, 4 pages.

Canadian Office Action dated Apr. 13, 2012 from related Canadian Patent Application No. 2,545,866, 4 pages.

\* cited by examiner

SYSTEM AND METHOD FOR ENABLING AN ADVERTISEMENT TO FOLLOW THE USER TO ADDITIONAL WEB PAGES

CROSS-REFERENCE TO RELATED APPLICATIONS

This application is a continuation application of and claims priority to U.S. application Ser. No. 10/748,681 filed on Dec. 31, 2003 and which claims priority to U.S. Provisional Application Ser. No. 60/516,281 filed on Nov. 3, 2003, the entirety of which is hereby incorporated by reference.

FIELD OF THE INVENTION

This invention relates to systems for and methods of providing an advertisement that enables a user to obtain additional Internet-based content while still viewing the advertisement.

BACKGROUND OF THE INVENTION

Internet users are often subjected to large quantities of ads. Many of these ads are graphical in nature, as graphics provide much information. However, graphical advertisements require more storage and take longer to transmit than small text advertisements. In addition, graphical advertisements can be distracting and intrusive.

Advertisers are motivated to make their advertisements catch people's attention. Accordingly, advertisements can be quite garish and obtrusive, forcing the user to wait or somehow take action. Users generally have little control over the display of these ads (other than to not visit certain web pages).

Such tactics frequently serve to annoy the user. As a result, online ad-blocking software has been developed. This software can prevent many types of ads from displaying on people's computers. The annoyance factor of ads today causes many people to not want to investigate what the ads are offering, even if they really offer something useful. Clearly, people are not happy with existing advertisements, such as graphical banners.

While existing systems allow advertisers to present graphics, they fail to provide effective and desirable advertisements that have a low annoyance factor for users. These and other drawbacks exist with current systems.

SUMMARY OF THE INVENTION

The various embodiments of the systems and methods described herein may comprise a computer-implemented method for advertising comprising the steps of delivering an electronic advertisement comprising one or more menu options and a reference to a network location for retrieving specified content associated with each menu option for inclusion in a first electronic document, receiving a selection of one or more menu options from the electronic advertisement and delivering a second electronic document including content from the referenced network location associated with the menu option selected, the second electronic document including the electronic advertisement.

The accompanying drawings, which are incorporated in and constitute a part of this specification, illustrate various embodiments of the invention and, together with the description, serve to explain the principles and advantages of the invention.

DETAILED DESCRIPTION OF EMBODIMENTS

Figure 1:
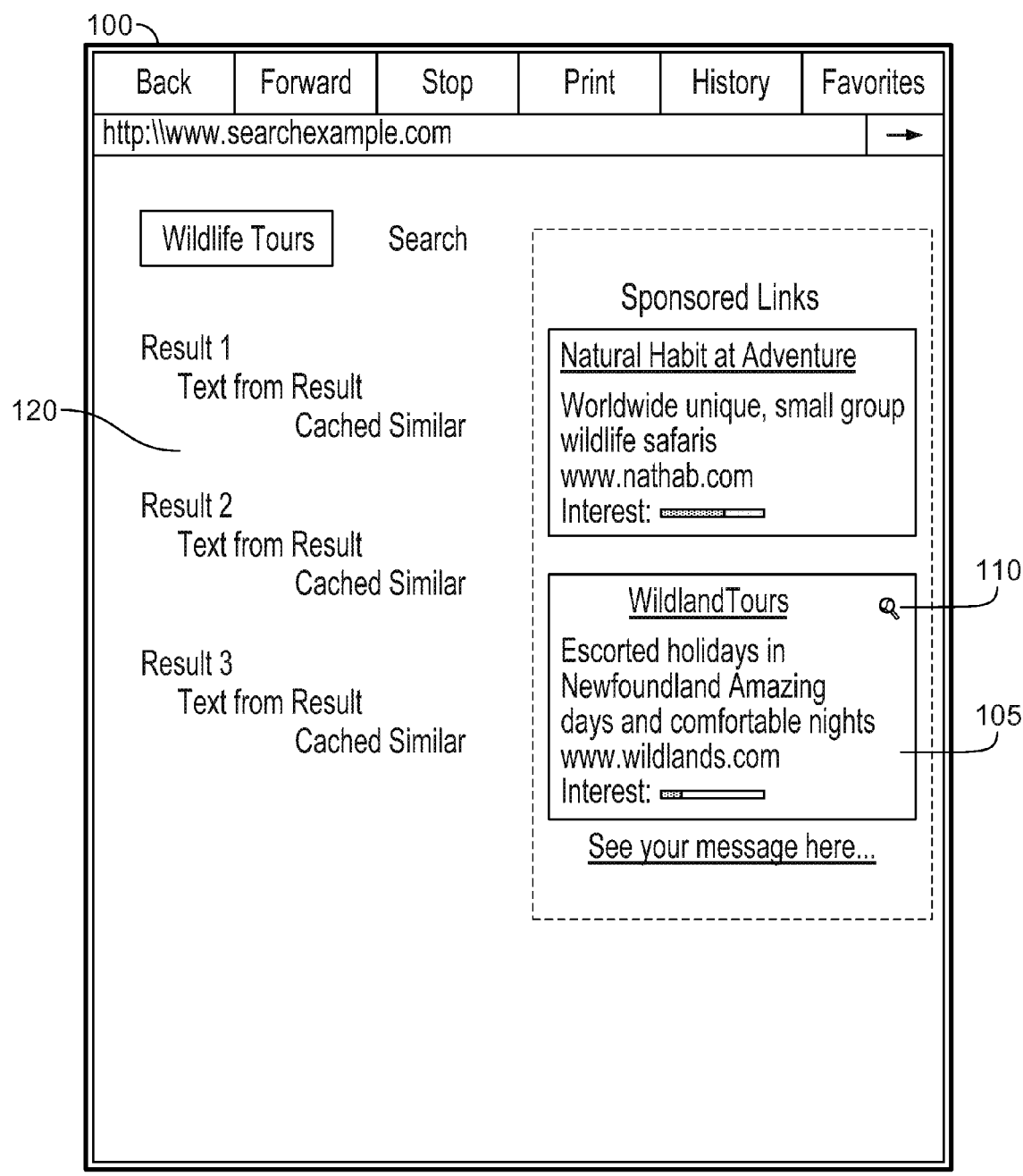
FIG. 1 depicts an exemplary electronic document including a morphing advertisement in a first display format according to an embodiment of the present invention.

The following embodiments are illustrative of various aspects of the invention morphing advertisement in an electronic document. In addition, various sub-headings are provided for guidance, but are in no way intended to be limiting as to where descriptions of various features might be addressed in this disclosure or the associated figures.

Advertisements may be presented in electronic documents, such as web content (e.g., web pages, email, HTML pages, XML pages, etc.), in a manner that enables transition from a first display format (e.g., a textual format) into a second display format (e.g., an interactive graphical menu-driven format, a larger textual format, a movie format, an audio format, etc.) on demand in a rapid fashion. In one example, the advertisement or a grouping of advertisements is/are presented first in textual format while enabling the user to expand the advertisement into a menu-driven, graphical advertisement. The menu-driven, graphical advertisement may enable the user to view the content of the advertisement and then return to the textual format if desired. The action taken by the user to initiate the second display format may comprise selection of an expansion icon, selection in a frame box, a market on the side, below or above the advertisement, selecting or roll over selected portions or highlights of the advertisement, simple "pass over" of the text related to the ad, other forms of user-initiated and controlled actions or other conditions, as discussed below. In addition, the size of the display of an advertisement, the size of expansion, where the advertisement is placed and/or what other advertisements it may cover may be based on a price parameter or other ranking formula (e.g., an amount an advertiser is willing to pay for each click, bid amount, price information, other measure of price, etc.) associated with the advertisement and others considered for placement.

Further, in one illustrative embodiment, the second display format may comprise a menu-driven, graphical advertisement that includes one or more menu-selections and further graphics or text to enable the user to find out more about the advertiser and/or its products before deciding whether to visit the pages of content to which the user will be transferred upon selection of the advertisement (e.g., in a pay-for-performance based advertising system). The menus may provide one or more selections that enable the user to view even more information/content related to advertiser and/or its products. When the user selects one of the menu selections, the contents page returned may include the same menu-driven graphics-based advertisement so that the advertisement "follows the user." A "home" link may be provided to transfer the user back to the contents/search page and menu-based graphical advertisement viewed before the user selected the menu selection in the advertisement. In one exemplary embodiment, the advertiser is not determined to have met a performance parameter (e.g., a "click-through") for a menu-selection within the advertisement, so the user is able to learn more about the advertiser and/or its products before it "clicks through." Enabling the user to view more information before an advertiser is deemed to have met a performance parameter that results in charging of a price parameter associated with the performance parameter makes the eventual referral more valuable to the advertisers.

Morphing Advertisements in Electronic Documents

FIG. 1 depicts an exemplary electronic document (e.g., web page, email, electronic newsletter, etc.) 100 that includes a plurality of advertisements (here two advertisements although fewer or more may be provided between the scope of the invention). Such advertisement(s) may appear on the electronic document (e.g., web page) to alert a user that certain goods or services are available. Specifically, the company and/or products in the advertisement(s) may relate to the contents of the electronic documents.

According to an embodiment of the present invention, one or more of the advertisements displayed in the electronic document may comprise a morphing advertisement. Specifically, a morphing advertisement may comprise an advertisement that changes from a first display format to at least one other display format (e.g., based upon a user request such as a user initiated activity, preference, or movement). The example provided in FIG. 1 illustrates a first display format for the second advertisement shown at reference number 105. As depicted in reference number 105, the first display format for the morphing advertisement may comprise textual information about the advertiser and/or its products. In addition, an expansion icon or other control element 110 may be provided to enable a user to request the transition of advertisement 105 into a second display format (e.g., a more detailed textual format, a graphical format, or a menu-driven interface format, just to name a few).

Although an icon has been shown for use in enabling a user to select to have the advertisement "morph" from the first display format to a second display format, it should be appreciated that other operations and/or modules may be provided to enable the user to indicate a desire to move from one format to another. In the example in which more than two display formats are provided for a morphing advertisement (e.g., three, four, etc.), various methodologies may be provided to enable the expansion or movement between the various formats as well. For example, there may be three display formats in which the image goes from a small size to a medium size to a large size, each time expanding into covering greater surface area in the electronic document. In doing so, a scroll bar or other escalating icon may be provided to enable the user to initiate movement between the various sized display formats.

Additionally, the morphing from the first display format to the second display format may be based on other factors, including the media mix of the page in which the advertisement is being included, the user's experience with the site and/or pages in which the advertisement is being included, the user's detected or specified connection speed, the number of advertisements included on a page, the available real estate in the page and many other factors.

Further, the original "advertisement" may comprise free information provided via the Internet and/or World Wide Web that expands to provide more information about an advertising entity and/or is products and/or services. In addition, the first display format may be an advertisement and the second display format may comprise free web-based information. For example, a search result entry in a search engine may be expandable into a local business listing that includes a picture, etc.

According to one illustrative embodiment, a first display format may be a compact format that is generally unobtrusive to the user and has a low annoyance factor as illustrated in the example provided in FIG. 1 at reference number 105. The compact format may comprise primarily text, with little or no graphics or icon content, although other compact formats may also be used. In this example, a user may request transition of exemplary advertisement 100 to a second display format by clicking on expansion icon 110 or through some other user-initiated action. Such action(s) may cause an advertisement in expanded format to be presented to the user as shown and described below in the example of FIG. 2. Expansion icon 110 is depicted here as a magnifying glass, however, other icons or mechanisms for expansion are contemplated.

Figure 2:
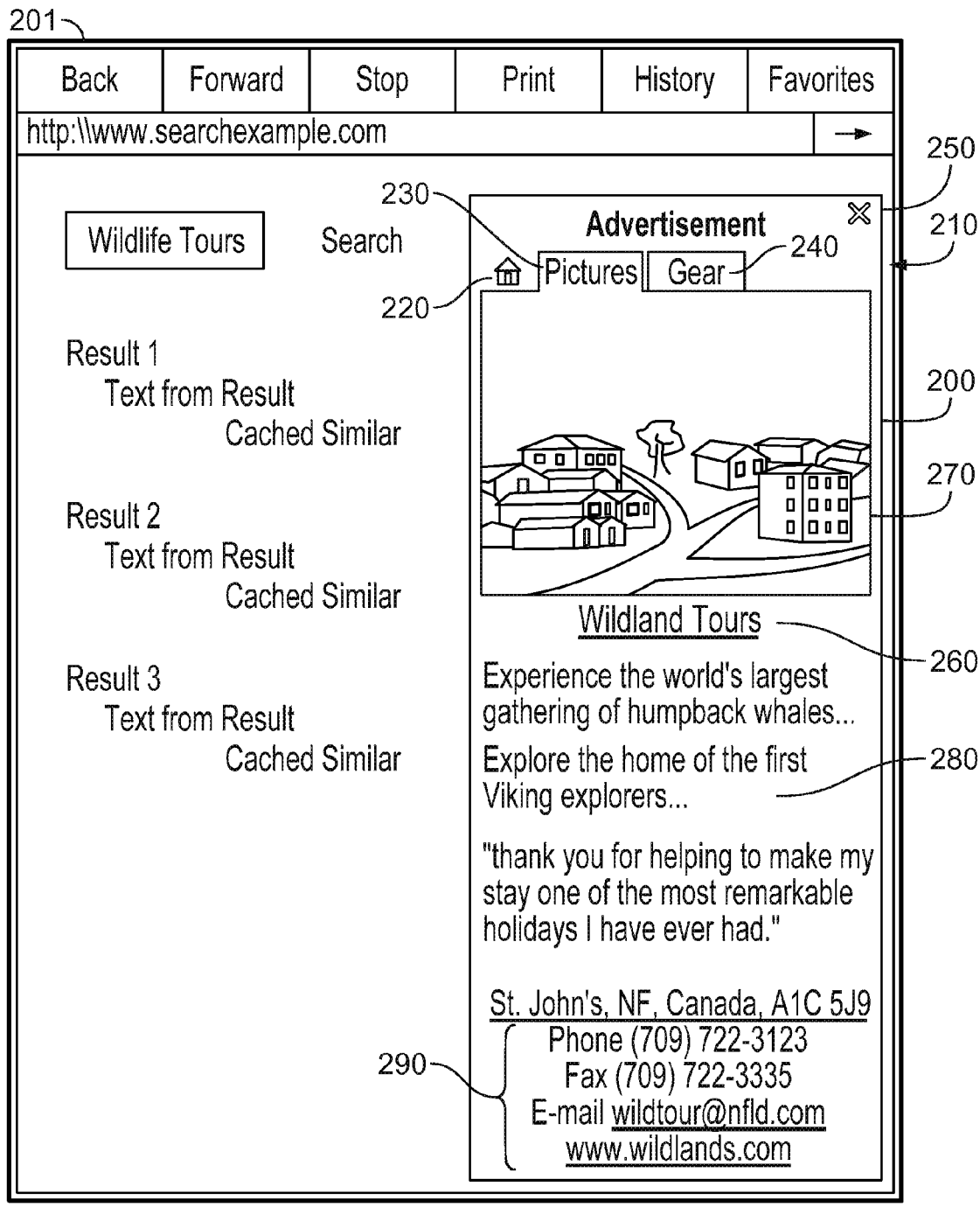
FIG. 2 depicts an electronic document including a morphing exemplary advertisement in a second display format according to an embodiment of the present invention.

FIG. 2 depicts an exemplary electronic document including the advertisement 105 of FIG. 1 in a second display format (e.g., in expanded format 200). Such an expanded format advertisement 200 may appear when a user clicks on expansion icon 110 of advertisement 100. By making the expanded format advertisement appear at the request of the viewer, either by explicit request (such as activating expansion icon 110), by a predetermined preference (as a user's preference setting) or through some other activation protocol based on user activity, the advertisement's format (e.g., prominence, appearance, size) is controlled by the user. The user has thus given consent and feels empowered. The user is further empowered to dismiss an annoying or inappropriate advertisement. This may be accomplished by including an icon for outright dismissal, an icon for shrinking back to compact format, or combinations thereof.

According to one illustrative iteration, the second display format may comprise a menu-based graphical advertisement 200. Advertisement 200 may include one or more menu options 210. Menu options 210 may be selected by a user to request additional information specified by the advertiser and shown in the expanded format. Alternately, or in addition, menu options 210 may be selected to enable the user to navigate to additional content (e.g., other electronic documents such as web pages) with such information as will be described below with reference to FIGS. 7, 8 and 11, for example. Menu options 210 may direct a current browser window in which the electronic document is being viewed, call up an entirely new web browser window, or activate pop-up windows with additional information.

In one illustrative embodiment, advertisement 200 may comprise menu options 210 that comprise a home option 220, pictures option 230, and a gear option 240. These options may be specified by the advertiser when creating the creative as depicted in further detail with respect to FIG. 11 below. Other options an advertiser may choose include a map option that displays map information for an advertiser or its products and services, a weather option that displays weather information related to an advertiser's location and many others that any advertiser may find useful for providing the user more information.

In addition, the advertiser may be able to select an image 270, expanded text 280 and contact information 290. The advertiser may also be permitted to specify an address that can turn into an automatically generated link to a map or picture of a map in the advertisement, for example. The main display 260 may be that utilized in the first display format of the advertisement, such as that as shown in FIG. 1, for example. Specifically, the home menu option 220 may be a default that is included in all expanded advertisements utilized in the system. The home icon may, upon selection, return the user to the original content/search page that included the expandable advertisement in the event that the user selects one or more of the other menu options and views other pages. Upon selection of picture icon 230 and/or gear icon 240, additional content may be displayed to the user in the content portion 201 of the electronic document (e.g., web page) while advertisement 200 continues to be displayed to the user.

In one example, advertisement 200 may persist on the user's screen during such navigation as described below (or at least appear that way by being refreshed as a part of each electronic document presented during the user's use of the advertisement and its menu options). The advertisement as shown in the second display format 200 of FIG. 2 is depicted as including a tabbed set of menu options 210. Pull down, icons, or other forms of menu options may also be used.

The menu-based graphical advertisement 200 example depicted thus presents an opportunity for the advertiser to tell the interested potential customer about its company, products and/or offerings through images, other graphics, or additional text. It may act as a synopsis of the advertiser's offering, with guides. It may lead and follow the user as he or she investigates, like a special navigation toolbar. It may even follow through to the destination site/page.

In one illustrative example, advertisement 200 may be offered in a controlled environment. For example, it may be operated in such a way to preclude pop-ups (unless specifically directed to by the user), or retrieving additional web pages/sites without a user's request. Such advertisements may follow a user around on his or her journey, providing a handy way back to the start of the journey, as well as a more consistent user experience.

Offering users expandable advertisements gives them the ability to safely investigate information about the advertiser and/or its products before going to the advertiser's designated target location (e.g., its target web page). As people get used to such advertisements, it decreases their inhibitions to investigating advertising content, and increases the exposure of advertisement host's information (if not their web sites). Charge-incurring performance parameters to the advertiser may be met less frequently because some "no" decisions will get made when a user has seen the second display format advertisement, but the quality of the charged performance (e.g., a click through and/or conversion to customer relationship) will be much higher. This embodiment also enables the user to quickly go through information available in the advertisement.

By measuring user response to advertisements, advertisement hosts can determine advertisement quality, and can use this as a criterion for determining whether or not to show a particular advertiser's advertisement. These conditions create an incentive for an advertiser to create accurate and pleasing and useful full-size advertisements.

By monitoring user manipulations (and timing thereof) of advertisements, advertisement hosts can determine advertisement creative quality, and in combination with site (or equivalent) performance, such as through click-through rate, improve advertisement targeting quality. To do so, various mechanisms may be employed, including, but not limited to, monitoring whether an image is downloaded (e.g., when the user expands the advertisement to a format including an image and the image was not pre-cached at the user's system). If an image is deliberately cached at the user's system, a 1×1 pixel may be retrieved from the server when the image is opened to determine that the image was opened and when that occurred (the retrieval of a 1×1 pixel is typically so unnoticeable that even if a delay in retrieval occurs, the user does not experience any degradation in performance). Likewise, on close of the image, a different 1×1 pixel may be retrieved to track that event and when it occurred. Other mechanisms may be used as well.

The events tracked may vary as well. For example, a statistically significant sample indicating long dwell time on an advertisement shows high creative quality. A statistically significant sample showing quick dismissals of the full size advertisement show poor creative quality, creative irrelevance or targeting imprecision. A statistically significant sample showing click-though to advertiser indicates good conversion potential, although a statistically relevant sample showing quick return to the page that hosts the advertisement from the click shows a poor customer experience and unlikely conversion. These monitored events may then be used by the system to determine whether an advertisement is effective and may use the effectiveness to determine whether the advertisement should be displayed as part of or regardless of a ranking scheme used to rank advertisements.

Figure 10:
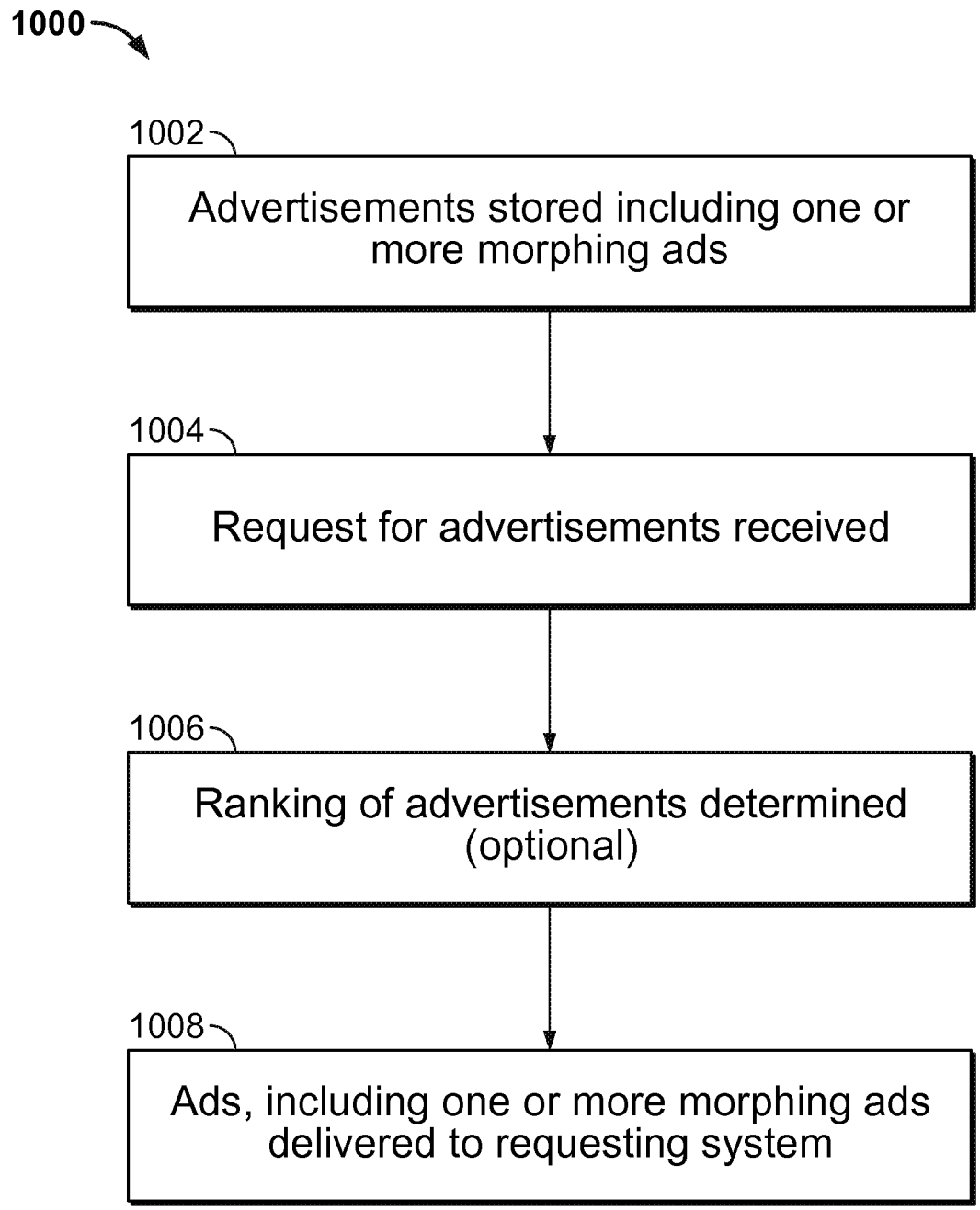
FIG. 10 depicts a method of using one or more morphing advertisements that enable a recipient system to modify the appearance of an advertisement based on a user request according to an embodiment of the present invention.

Accordingly, one illustrative method of the present invention is depicted in FIG. 10. In this method 1000, a step 1002 is performed in which advertisements are stored, the advertisements including one or more morphing advertisements such as in our database system as is well known in the art. In step 1004, a request may be received at the advertisement/content system for an advertisement to be provided. In step 1006, ranking of advertisements may be determined as an optional feature as discussed above. In another embodiment, advertisements may be provided in some other format based on other predetermined criteria (e.g., match advertisement format to page media and layout). In step 1008, one or more morphing ads may be delivered to the end user system that include the code that enables the end user system to effectuate transitioning the ad from a first display format to a second display format as described in greater detail below.

System for Receiving and Delivering Morphing and Menu-Driven Advertisements

Figure 3:
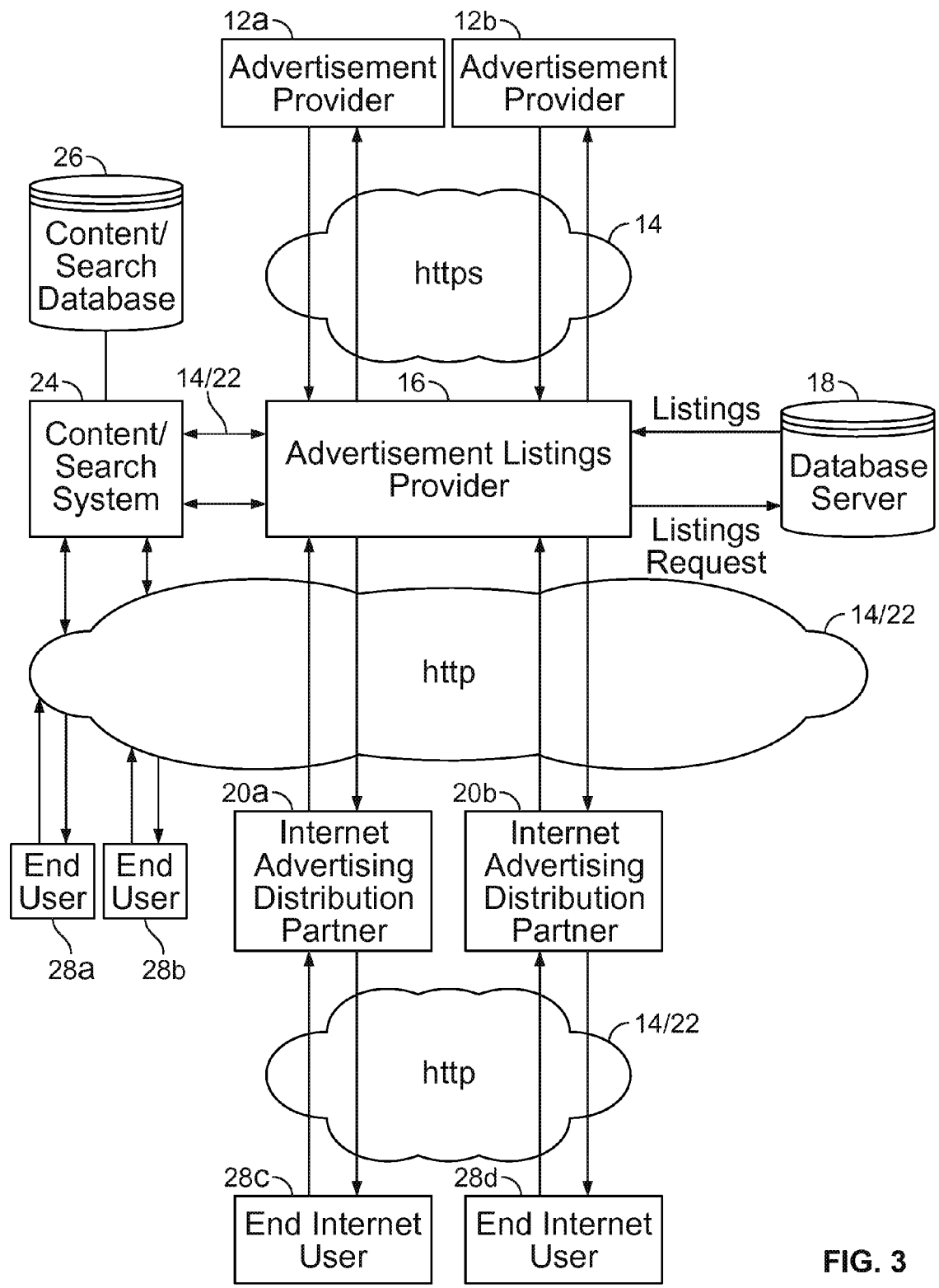
FIG. 3 depicts a system for delivering one or more morphing advertisements according to an embodiment of the present invention.

An embodiment of a networked environment in which such a system may operate is depicted in FIG. 3. In such a system, advertisement providers 12 connect over a network 14 to an advertisement listings provider 16 (e.g., using a secure https connection) to register, provide payment information, one or more price parameters (e.g., an amount an advertiser is willing to pay for each click, bid amount, price information, other measure of price, etc.) and associated advertisements (also called creatives) associated with the price parameter. For example, the advertisers may provide their price parameter(s) in association with a keyword for use in a search engine system and may also provide a price parameter in association with content on a content portal or content distribution system. The advertisement listings provider 16 then stores the information on a database server 18 for later transmittal. The advertisement listings provider 16 may then distribute the listings through various forums or feeds, including direct distribution in print media, providing the listings on one or more web sites affiliated with the advertisement listings provider, through internet advertising distribution partners 20 (also called syndication partners) (connected over network 14 or 22 depending on security desired), through content systems 24 (with associated content databases 26) and through search engine systems operated by the advertisement listing provider or internet advertising distribution partner(s).

Through these various forums, the advertisements provided by the advertisement provider may be included in pages displayed to end users 28 (often called an impression). In one embodiment, the advertisement provider 12 is only obligated to pay if the end user meets some performance parameter (e.g., clicks-through the advertisement to the web page target provided by the advertisement provider in affiliation with the particular ad, activates a coupon, becomes a registered user, purchases an item, completes a phone link (in the event of a wireless/phone hookup), for example). In addition, the advertisement listings provider 16 may only be paid when a certain performance parameter is achieved (e.g., a click-through occurs or a conversion occurs, etc.) or some other monetization event occurs. Also, traditionally, the advertisement listing provider 16 and internet distribution partner(s) 20 may agree to share the revenue for the charge-incurring performance (e.g., click-throughs generated) through distribution via the internet distribution partner 20.

Each of advertising listings provider 16 and advertisement provider 12 may comprise computerized systems that include one or more of the following systems: a web server, a database server, proxy server, network balancing mechanisms and systems, and various software components that enable the system to operate on the internet or other network type system. Additionally, networks 14 and 22, although depicted as http networks, may comprise other networks such as private lines, intranets, or any other network. Preferably, the connection between advertising provider 12 and advertisement listing provider 16 may comprise secure network connections to insure that data is not subject to attack or corruption by any hacker or other third party. In addition, whereas two advertisement providers are depicted, it should be appreciated that one or more advertisement providers 12 may be provided in the network. Similarly, although one database server 18 is depicted, it should be appreciated that multiple database servers may be provided and that such database servers may be connected to the advertisement listing provider via any type of network connection, including a distributed database server architecture.

Similarly, content system 24 and content database 26 may comprise any number of such systems connected to the advertisement provider or advertisement listing provider 16 via any type of network, including an http or https network. Content provider 24 may comprise a system such as advertisement listing provider 16 that provides functionality for enabling connection over the internet or other network protocols. End users 28 may comprise any user connected to the internet and may comprise computerized systems that enable that connection through any of various types of networks, including through internet service providers, cable companies, and any other method of accessing data on the internet. Internet advertising distribution partners 20 may comprise any system that distributes internet-based advertising to end users. Whereas two internet advertising distribution partners 20 are depicted, any number may actually be provided.

In general, in these embodiments, the advertisement listing provider 16 generates revenue when end users achieve performance parameters or some other monetization event (as discussed above) occurs relevant to an advertisement such that the advertising system can charge a price parameter participating advertisement providers select. The advertisement listing provider 16 may also incur costs for every impression that it reaches in the form of overhead in running a web site or distribution agreements for distribution. Accordingly, the various embodiments of the present invention recognize that in such systems, it is the revenue per specific page served (effective revenue per impression) that generally produces the advertisement listing provider's profits (also called page real estate revenue efficiency). By using page real estate revenue efficiency to rank advertisements then, the advertisement listing provider's rankings track its own profitability. This is particularly true for distribution channels with limited numbers of slots for advertisements.

Figure 4:
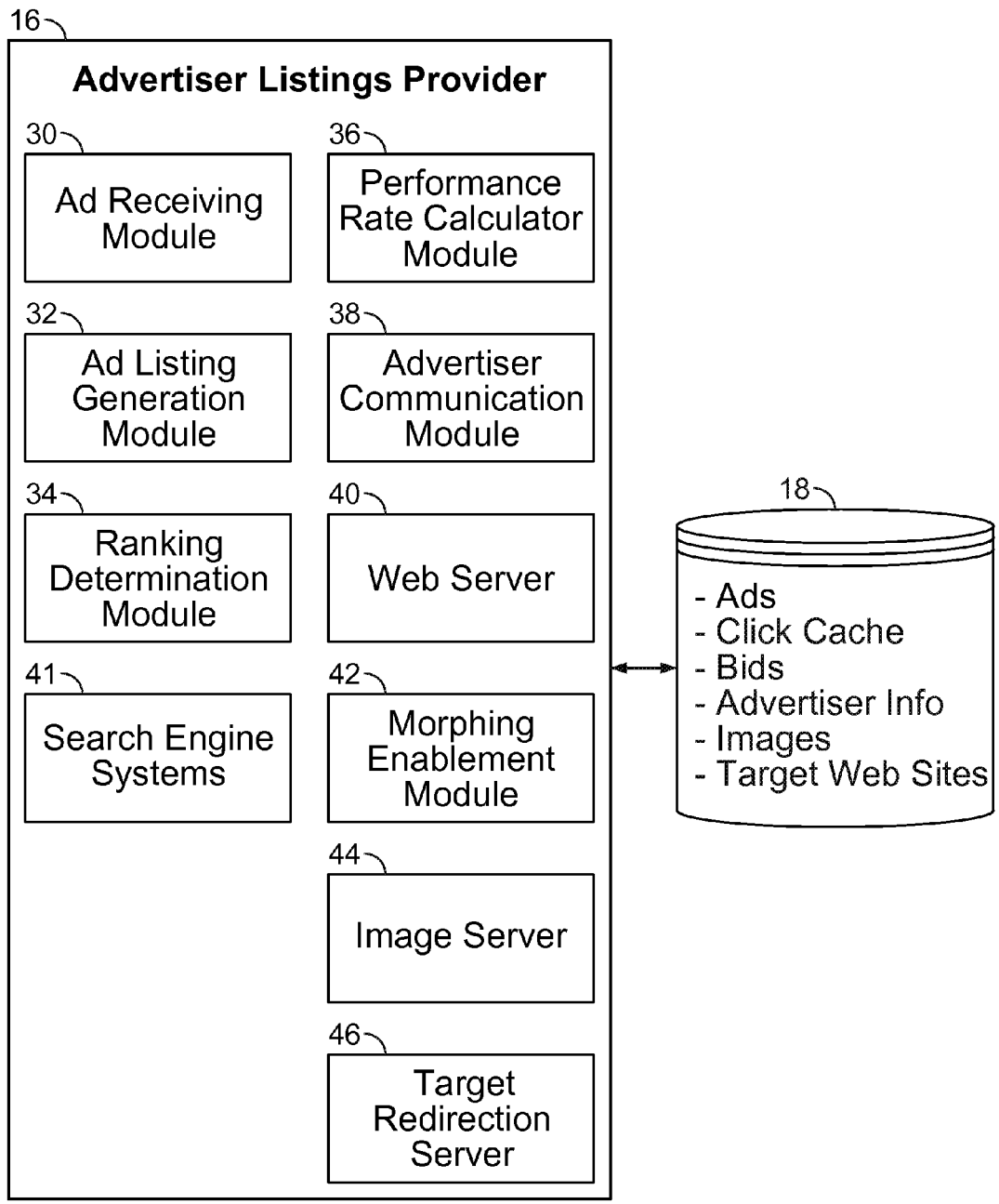
FIG. 4 depicts an exemplary system for receiving and delivering morphing advertisements according to an embodiment of the present invention.

As shown in FIG. 4, the advertising listing provider 16 may comprise a system that provides an advertisement receiving module 30 for interacting with advertising providers to receive advertisement information. It may also comprise an advertising listing generation module 32 that generates a listing of advertisements from the database based on criteria provided and depending on the forum for the advertisements (e.g., search engine, content portal, distribution partner, etc.). A ranking module 34 may generate an order to the listing based on rankings based on a model. In one embodiment, the ranking module 34 may determine rankings based on price parameter values, revenue efficiency and performance, in conjunction with a performance rate determination module 36 (e.g., a click-through-rate calculator, conversion calculator, coupon selection calculator, phone through rate calculator, etc.). The resulting advertisements generated and ranked may then be communicated through various channels. An advertiser communication module 38 may also be provided for communicating with the advertisers. For example, it may be desired for the system to alert an advertiser prior to changing the advertisement used for a given price parameter or before moving the advertisement down or up in the rankings. A database 18 may be provided in affiliation with the advertiser listing provider to store advertisements, price parameters, advertising information and a cache of clicks to be used to determine the performance-rate.

Additionally, because advertising listings provider 16 may provide the functionality of distributing advertising itself and providing search engine results, web server system 40 may be provided as well as a search engine system 41. It should be appreciated that multiple such systems may be encompassed within the advertising listing provider system 16.

Additionally, a morphing enablement module 42 may be provided that takes data stored for a morphing advertisement in the database system 18 and generates a morphing advertisement for inclusion in an electronic document as described below, for example. An image server 44 may be provided to serve images associated with advertisements, if desired. Also, a target redirection server may receive a target selection from the user system, log the event for billing purposes and redirect the user to advertiser specified content.

Additionally, database server system 18 may comprise one or more database systems that store various types of data including one or more of the following: advertisements, the click cache, price parameter information, and advertiser information including registration information about the advertisers, accounts for the advertisers, payment information and other information as described herein. Numerous modules may not be provided in various embodiments and/or the modules may be combined together to provide the functionality described. Further, the modules may be dispersed across multiple physical systems or may be duplicated across multiple systems.

Generating a Morphing and Menu-Driven Advertisement for Inclusion in an Electronic Document Enabling an advertisement to be changed from a first display format to a second display format may be accomplished in a wide variety and manner of ways. Web pages that host such advertisements may be, but are not limited to, HTML. Technologies for achieving such changeable advertisements include, but are not limited to:

A) Using dynamic user interface logic, such as dynamic web page with JavaScript, vbscript, or dynamic content such as macromedia, or signals to and from an embedded control such as a toolbar, to modify the visible page; or B) As above, by creating a pop-up; or C) Bringing in another page with the advertisement expanded. This option may be employed to limit or avoid dependency on browser type or settings.

According to one illustrative embodiment, the electronic document may include Java Script code that enables a user to select to have the advertisement morph from the first display format to a second display format. An example of the HTML-based Java Script code to perform his function is as follows: An example of the JavaScript code, embedded in or referenced by an HTML page, to perform this function is as follows:

```
<SCRIPT LANGUAGE="JavaScript">
<!--
//
// This JavaScript function takes an object identified by currentElement
// and toggles its visibility. It is called by the Morphing function below
//
function toggleVisibility( currentElement ){
    dom = document.getElementById( currElem ).style;
    state = dom.display;
    dom.display = (state == 'none')? "": "none";
}
//
// This JavaScript function takes an advertisement identified by
// currentElement and modifies display parameters on HTML page
// content so that the user perceives that the ad morphs. In this example,
// all ads of one form -- the 'plainAds' -- are hidden,
and the selected ad is morphed by making its alternate form visible.
// This function is invoked by the morphing selection mechanism.
//
function morph( advertisement ){
    toggleVisibility( 'plainAds' );
    toggleVisibility( advertisement );
}
-->
</SCRIPT>
<!-- Suitably tag HTML code with identifiers -->
```

Also, to speed the delivery of images, graphics, or other large files to be included in a display format, the code included in the electronic document may preload such images, graphics, or other files (e.g., into the cache of the browser) so they can be more quickly displayed upon selection by the user to display the second display format. n example of the JavaScript code to pre-fetch an image is as follows. The code can be embedded in or referenced by an HTML page, it is shown here as code embedded in an HTML page:

```
<SCRIPT LANGUAGE="JavaScript">
<!--
// declare an array to hold all the cached image references, in this case one
var images = new Array(1);
// instantiate an image object for each cached image
images[0] = new Image( );
// associate the image object with the URL of an image, which it will
automatically fetch images[0].src = "imageads.google.com/
HZT5311590625_1.jpg";
// put any other warm-up code or JavaScript funcations here....
...
-->
</SCRIPT>
```

Morphing and Menu-Driven Advertisements in Syndication/Distribution

Figure 5:
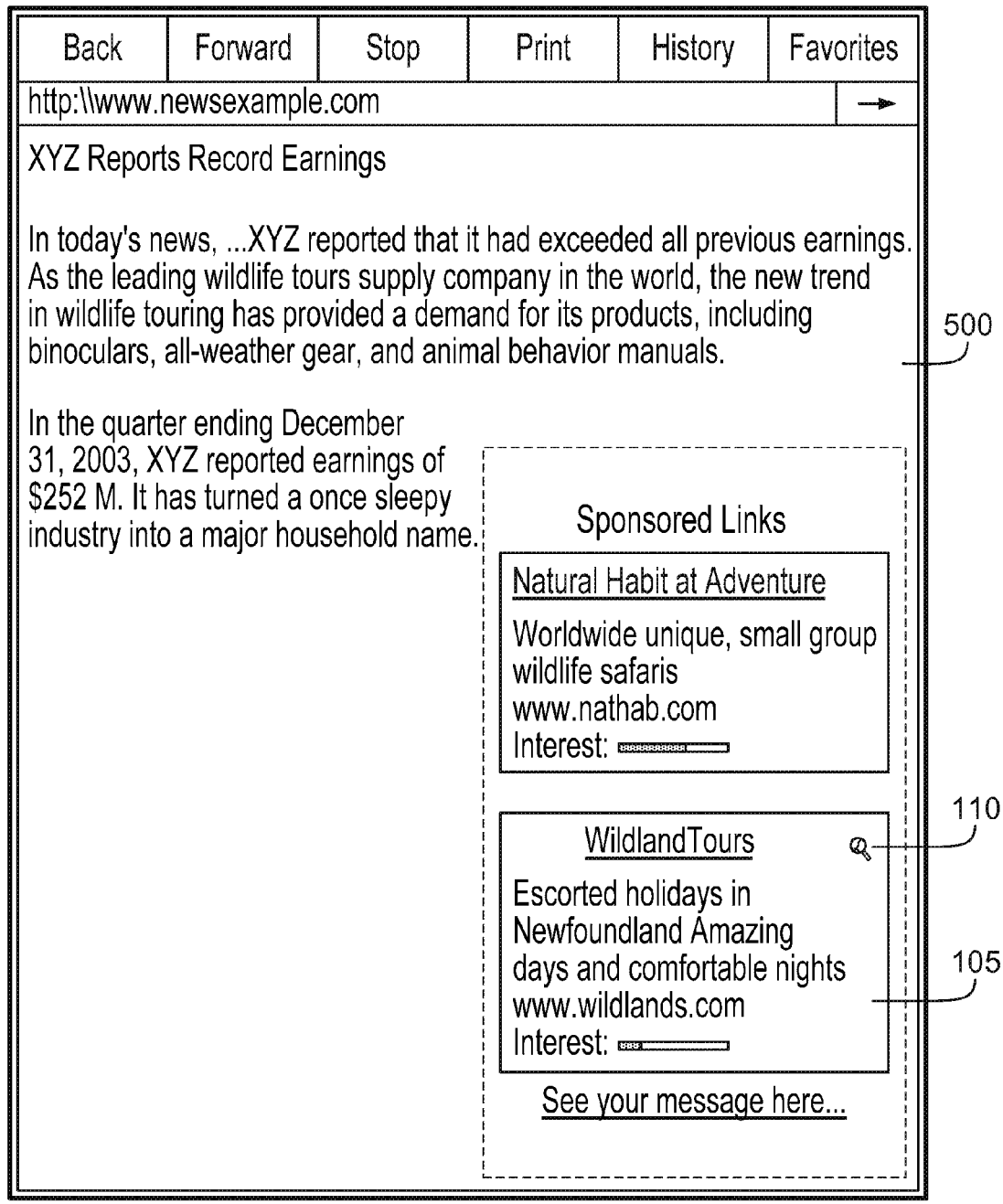
FIG. 5 depicts an exemplary electronic document including one or more morphing advertisements in a first display format according to an embodiment of the present invention.
Figure 6:
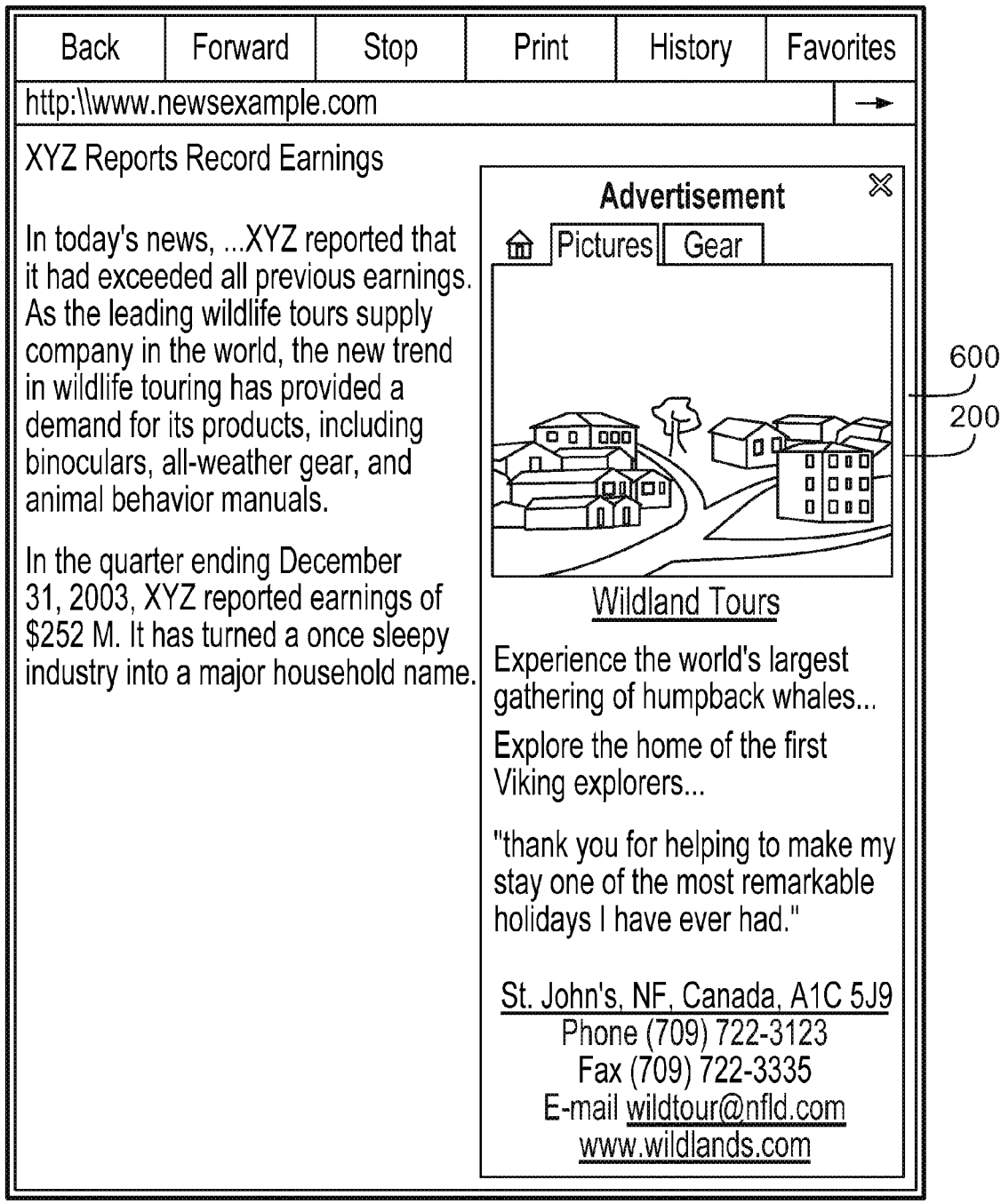
FIG. 6 depicts an electronic document comprising a morphing advertisement in a second display format according to an embodiment of the present invention.

According to another illustrative example of the present invention, the morphing advertisements may be incorporated into content based systems through a syndication system (e.g., distribution partner) as described above with respect to FIGS. 3 and 4. Specifically, various web sites may desire to include advertisements related to the content of their various web pages on the web site. As a result, such advertisers may enter into agreements with the advertising listing provider to provide advertisements that relate to the content of their site. An example of a web page resulting from an advertisement provided by the advertising listing provider to the content system is illustrated in FIG. 5. In this example, a news site is displaying news related to various topics of interest. In this example, the advertisements content 500 includes a report relating to the financial success of a company XYZ which is in the business of providing equipment for wildlife tours. Accordingly, such news story may be determined by the advertising listing provider to be related to wildlife tours and thus the advertisements depicted in FIG. 1 may be syndicated to the content provider system for display in the web page as shown in FIG. 5. In similar fashion as described above with reference to FIGS. 1 and 2, this may be a morphing advertisement which may morph into the format as shown in FIG. 6 whereby the morphing advertisement covers the entire area allocated by the content system for advertisements based upon the user's selection of the morphing icon or other mechanism for requesting transition from a first display format to a second display format.

Further Details on Menu-Driven Advertisements

According to another illustrative embodiment of the present invention, the morphing advertisement may comprise a format that includes a menu-based graphical format as shown for example in the illustrative example of FIG. 2. Such a display format may enable the user to navigate to various other pages of content provided by the content/advertisement system without necessarily transitioning to a web page sponsored by the advertiser. This provides the ability of the user to maintain control over whether they visit the advertiser's web site but also allows the user to find out more information relevant to the advertiser and/or its products. In this example, the advertisement may be thought of as following the user around as they visit the various pages of content selected by the advertiser in association with the menu options presented in the advertisement. Content may be restricted to a specific site, such as Google, or content cached by the site (e.g., Google) to allow quick, anonymous browsing as explained below.

Figure 7:
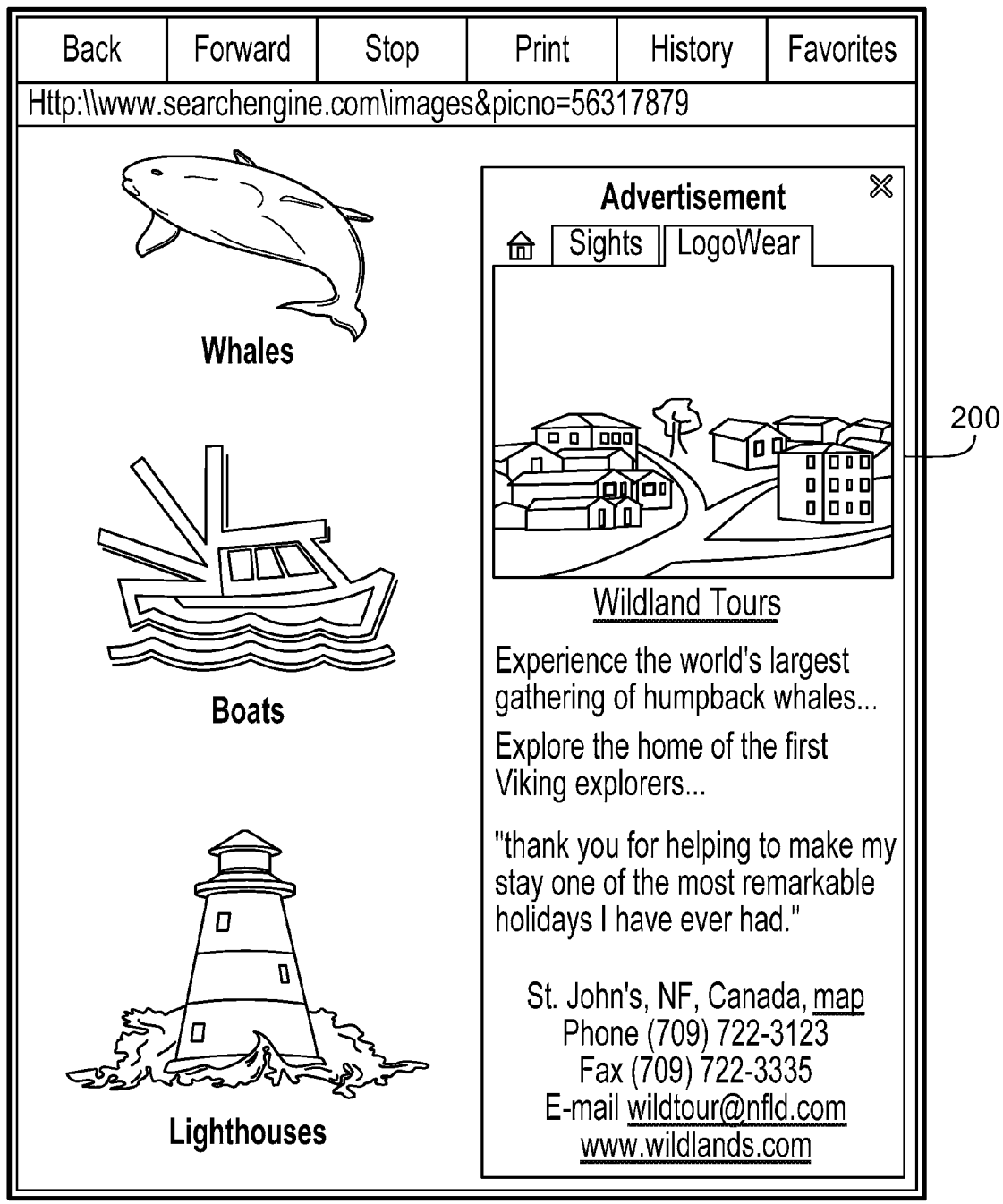
FIG. 7 depicts an exemplary electronic document generated upon selection of a menu option in a menu-driven advertisement according to an embodiment of the present invention.

As shown in FIG. 7, one of the menu options may comprise a menu option to view pictures relevant to the advertised wild life tour. Upon selecting that menu option, a request may be transmitted based upon the content supplied in the advertisement back to the advertisement listing server which may then return a web page that includes content specified in the URL associated with the menu option and including the menu-driven graphical advertisement as well. In this way, the user continues to have the advertisement as a point of reference for navigating to various other pieces of information or back by selection of the home icon. In this example of FIG. 7, various pages of images may be displayed and such images may be those hosted by the advertising listing provider/content provider that the user is visiting. Of course it is within the scope of the present invention that the referenced page that is displayed by the advertisement may comprise pages of content on other sites as well. One of the advantages of containing the pages to which the user is taken is to create a safe experience for the user so that they feel comfortable selecting these links and not necessarily visiting other web pages. Specifically, if the content/advertisement provider has established a reputation as being a "safe place" on the Internet for the user to visit and experience, that system would want to continue that reputation by ensuring that the pages visited through the menu-driven graphical advertisement are also safe. For example, the pages referenced may be limited to those pages approved or associated with the content/advertising system that is the host of the original page where the user received the content and the menu-driven advertisement.

Figure 8:
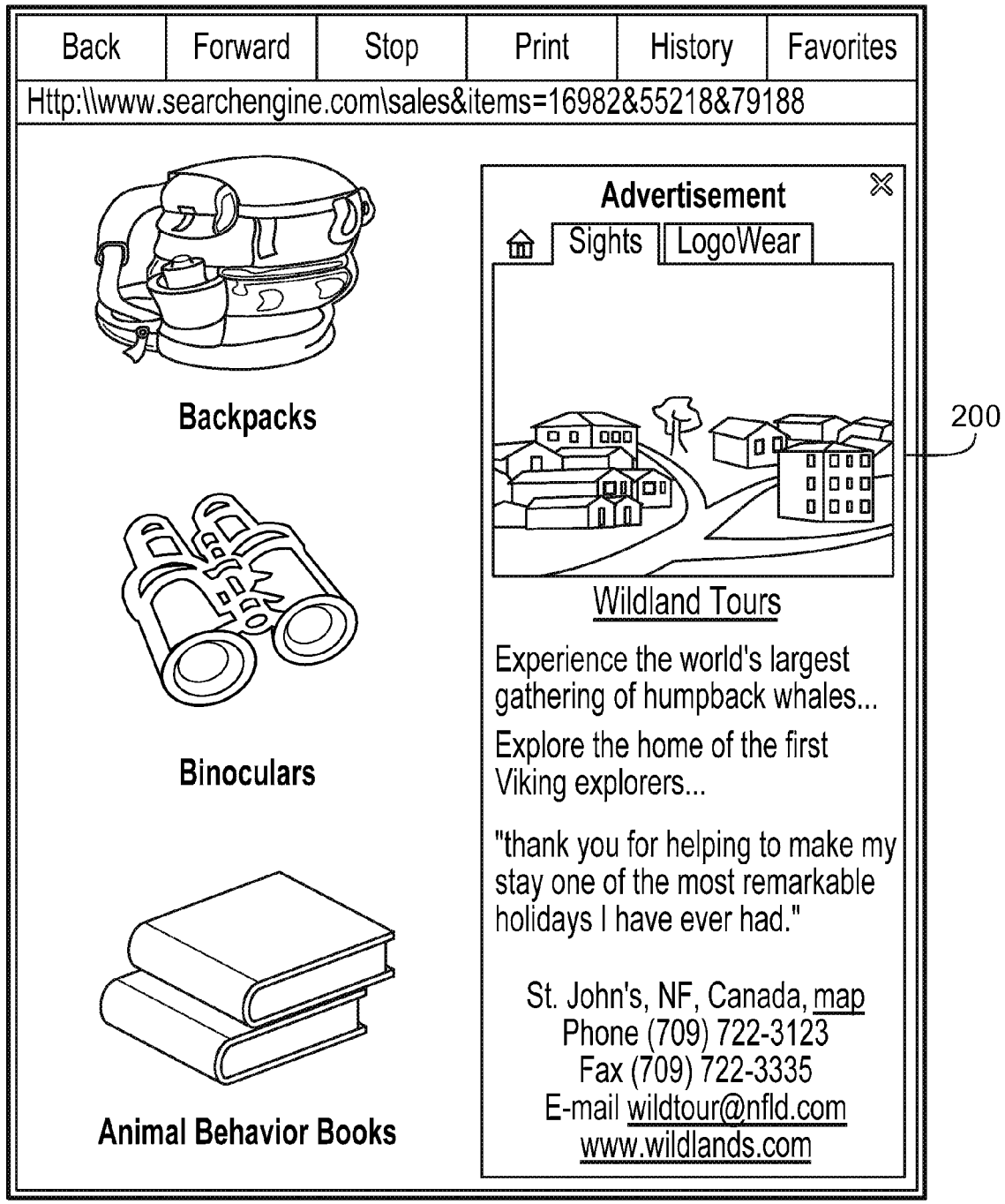
FIG. 8 depicts another exemplary electronic document generated upon selection of a menu option in a menu-driven advertisement according to an embodiment of the present invention.

As shown in FIG. 8, another selection on the menu-driven advertisement may comprise a request to view items for sale (gear) related to the wildlife tour companies suggested items for taking such a tour. In this embodiment, the user may be taken to view various items for sale through pages hosted or affiliated with the content/advertisement system to again provide the feel of a safe confined experience for the user. Once again, upon selection of the menu option, the advertisement may transmit to the content/advertisement system a request for a page as specified in association with that menu option within the advertisement of the HTML page already on the user system. The advertisement/content provider system may then return the requested content along with the menu-driven advertisement as well to again allow the advertisement to "follow the user around." Given the fact that the advertisement is not changing, it will appear to the user in a preferred embodiment that the advertisement does not "change" because the browser is not required to change any of the pixels depicted for that portion of the electronic page.

Another advantage of the advertisement following the user is that the advertisement may be present during the purchase of items, such as through an interface depicted in FIG. 8. Thus, the advertisement may record feedback from the user at the point of purchase to determine the effectiveness of the advertisement, etc.

In other embodiments, the system may utilize frames such that the advertisement is treated as one frame that does not need to be refreshed whereas the other content portions of the page are refreshed. Various iterations of this may be employed by one of ordinary skill in the art such that the advertisement may "follow the user" to various pages of content as specified in the menu options of the advertisement.

Of course, the advertisement that "follows the user" may not be a morphing advertisement, but may be static or some other format as well. Also, as should be appreciated, the system for providing this functionality may include an electronic advertisement output system that delivers the electronic advertisement comprising one or more menu options and a reference to a network location for retrieving specified content associated with each menu option. The system may also receive a selection of the menu option from the electronic advertisement and deliver a second electronic document (e.g., web page) including content from the referenced network location associated with the menu option selected, the second electronic document including the electronic advertisement. In various embodiments, one of the menu options may be a home option such that the page delivered upon selection is the electronic document (e.g., web page) originally presented to the user with the advertisement or some other electronic document designated as the home document (e.g., home web page) by the referenced link. The advertisement may be a morphing advertisement as described above or some other form of advertisement that is either displayed independently or in connection with one or more electronic documents (e.g., web pages).

The network locations (e.g., URLs) specified in reference to the menu options may comprise network locations provided by or affiliated with a host entity that delivered the first electronic document and electronic advertisement to provide the "safe" experience described. This type of advertisement may be used in a price-based display system described in greater detail below or in any other system as well. The system may store the reference to the advertisement for use by the user in retrieving the advertisement and may also store the referenced electronic documents (e.g., pages) or content thereof as well, if desired. If the reference is stored, then the advertisement may be bookmarked by the user using that reference. The referenced electronic document may comprise web pages provided by or affiliated with the host entity or the advertiser, including pages where the user may purchase items for sale related to the advertisement either hosted by the operator of the system or the advertiser. The system may receive feedback information relating to the purchases on referenced electronic documents (e.g., pages) for tracking the effectiveness of an advertisement as it follows the user to various referenced electronic documents (e.g., pages).

Figure 9:
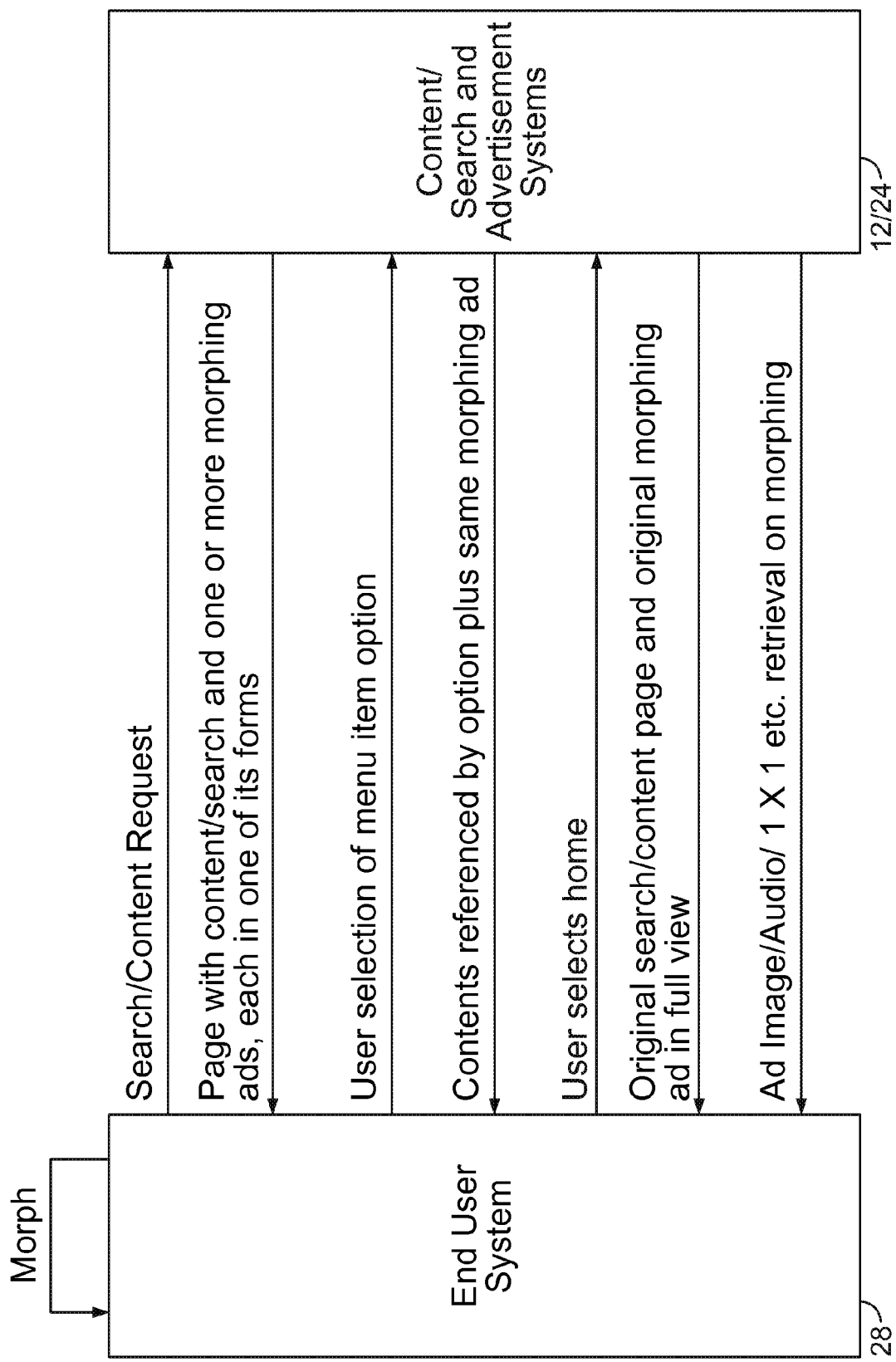
FIG. 9 depicts a schematic diagram illustrating the exchange of information and requests between an end user system and a content/search and advertisement system according to an embodiment of the present invention.

One example of a menu-driven advertisement experience is depicted in FIG. 9 wherein an end user system 28 and content/search and advertisement system 12/24 are depicted. An end user system 28 may transmit a search/content request to the content/search and advertisement system 12/24. That system may then return an electronic page with content/search results and one or more morphing advertisements. Upon selection or other indication by the user to transition the ad or morph the ad from a first display format to a second display format, a request may be processed solely at the end user system based upon the Java script described above. Accordingly, no further instruction to content/search and advertisement system may be required to transition the ad from a first display format to a second display format. If, however, a user selects one of the menu options on a menu-driven graphical advertisement, then a request may be transmitted to content/search and advertisement systems 12/24 and in return, the referenced menu link contents plus the same morphing advertisement may be presented and transmitted back to the end user system. If at any time the user selects the home option 220 in the menu-driven graphical advertisement 200, the original content/search results and advertisements in the expanded second display format that includes the menu-driven advertisement may be transmitted to the end user system. In another example, an advertisement may be targeted to local users and so a map link may be provided as an option that displays electronic mapping data and information.

In other embodiment, the morphing advertisement, such as a menu-driven advertisement (used as a business listing or when an advertiser does not have a web site, for example), may be separately bookmarkable by having a separate URL associated therewith. Accordingly, a user could choose to view the advertisement whenever they desire by referencing the bookmark.

Figure 11:
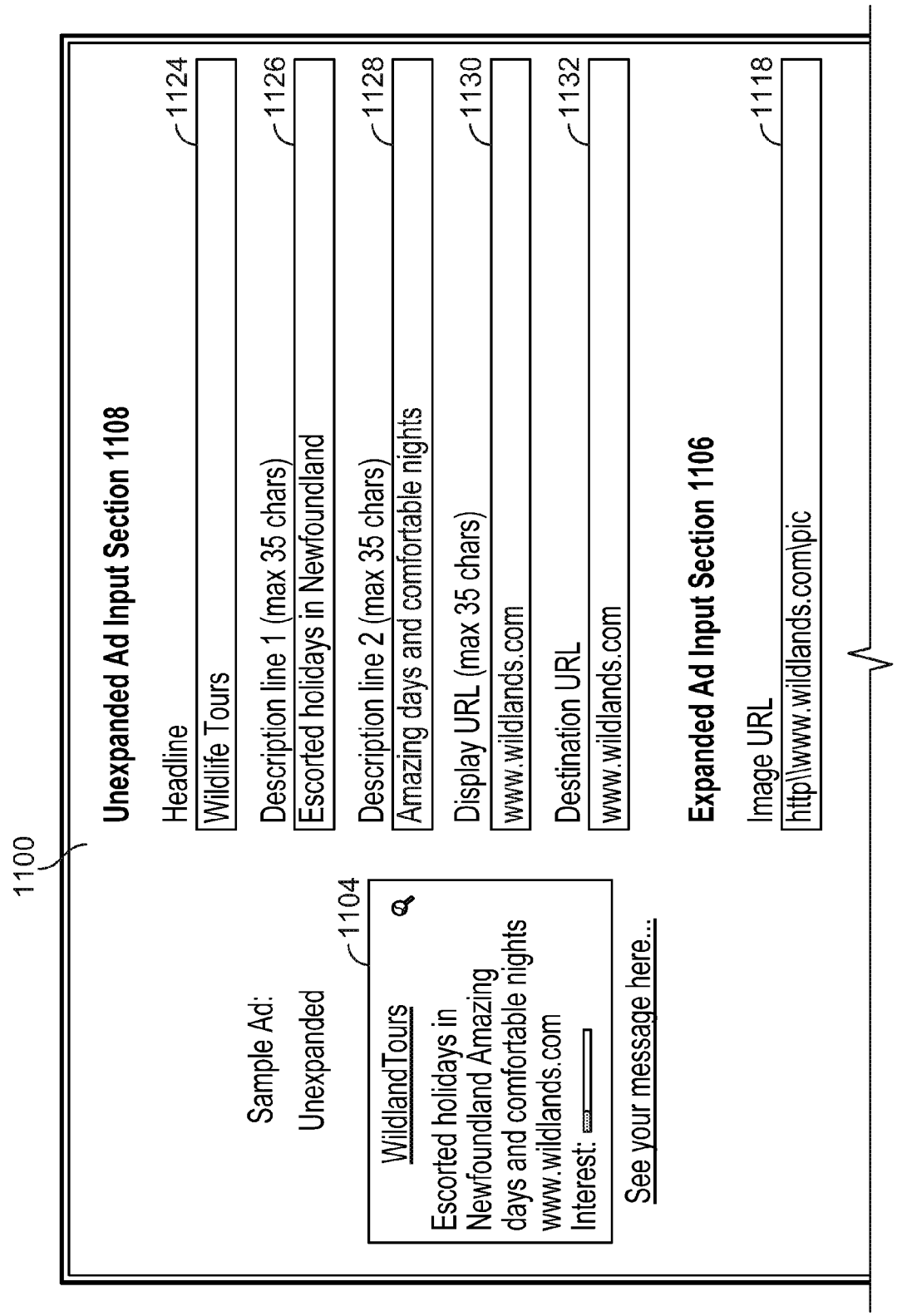
FIG. 11 depicts an exemplary interface through which an advertiser may provide information to be included in a first and second display formats (e.g., unexpanded and expanded formats) of a morphing advertisement according to an embodiment of the present invention.
Figure 11:
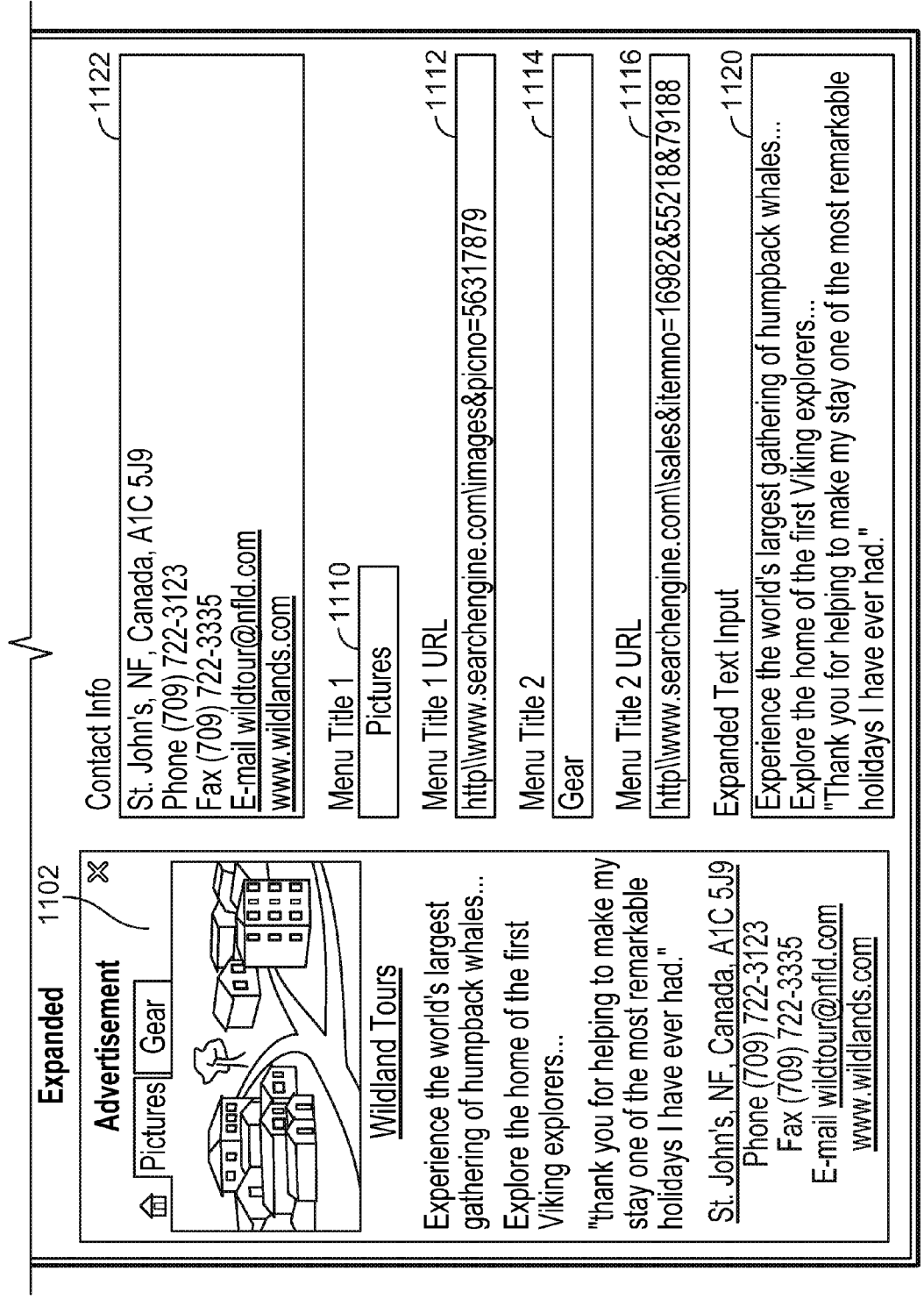

Interface for Inputting Components and Contents of Morphing and Menu-Driven Advertisements Various interfaces are well known in the art for enabling advertisers to provide the contents for an advertisement to be included in such advertisement distribution systems as described above. In particular, various advertising listing systems have been developed that enable advertisers to place price parameters for their advertisement to be associated with concepts such as keywords, content or combinations thereof. An illustrative example of an interface that enables a user to specify the contents of a morphing advertisement is provided in FIG. 11. FIG. 11 depicts an interface 1100 that comprises various sections. In section 1102, an example of the expanded (or second display format) may be depicted to enable the user to have an idea of what the advertisement will look like when it is displayed to an end user based upon the contents of information provided in the expanded display format input section 1106 and the unexpanded display format input section 1108. In section 1104, an example of the unexpanded format (or first display format) is depicted based on the information in the unexpanded display format input section 1108.

As shown, in the illustrative example, the input fields for the expanded display format 1106 may include a first menu title input box 1110, a first menu title URL input box 1112, a second menu title input box 1114, and a second menu title input box 1116. As indicated in the example of FIG. 11, the input in the menu title boxes may be the heading titles displayed in the advertisement as shown, for example, at 230 and 240. As discussed above, although a tabbed menu mechanism is currently illustrated, other methods of displaying menu options are within the scope of one of ordinary skill in the art, including drop down menus, etc. Associated with each of the menu titles may be a URL to which the user will be transferred to receive additional content for the advertisements, such as described above with reference to FIG. 7 and FIG. 8. As shown in these examples, the input may comprise a URL that comprises various inputs to specify specific contents of the page, such as the pictures in FIG. 7 or the items for sale depicted in FIG. 8.

In addition, section 1106 may include an image URL input box 1118 where the user may specify the location (or drag and drop it) of an image to be displayed as a portion of the menu-driven graphical advertisement such as that depicted in FIGS. 2, 6, 7, and 8. The image may be cached by the advertisement service for high performance, high reliability and user anonymity. In addition, an expanded text input box 1120 may be provided to enable the advertiser to specify a larger amount of text about the company and/or items for sale that are being advertised than are capable of being displayed in the smaller, unexpanded format as depicted in FIG. 1 and explained below. Further, in this example, a contact info input box 1122 is provided to enable the user to specify contact information such as that depicted in FIG. 2. It is also within the scope of the present invention for the contact information to be based upon the account information on file for the advertiser such that the advertiser does not need to specify this information in this advertisement input interface 1100. Such information may be automatically populated from the accounting database utilized by the system to keep track of amounts due to the advertising listing provider from various advertisers.

As shown, interface 1100 may also include various inputs in the unexpanded display input section 1108. As is known in the art, such information may include a headline input field 1124, first and second description input options 1126 and 1128, a display URL input 1130 and a destination URL input 1132. The display URL may be that URL that is displayed as a part of the advertisement, whereas the destination URL could be a more specific page within that web site or could be another URL entirely depending upon the preferences of the advertiser.

The contents of interface 1100 that are specified by an advertiser may be subject to approval by a human and/or automated computer process sponsored by the advertising listing provider. In one embodiment, advertisements may be approved only if they are related to the keywords or content for which the advertiser has supplied a price parameter associated with the advertisement. Accordingly, if the images or menu options included in this advertisement take the user to pages unrelated to the content of the advertiser, then such information may be rejected and the advertiser may be required to update this information. Other approvals may also be performed, such as ensuring that the advertisement does not include offensive material.

In addition, whereas a specific number of inputs and types of inputs have been specified in this example, it should be appreciated that fewer or additional inputs and types of inputs may be included within the scope of one of ordinary skill in the art. For example, audio files, movie files, animations, and other types of file inputs may be permissible according to various iterations of the present invention. In such an embodiment, various input boxes may be provided in interface 1100 to enable the advertiser to specify the source file or to upload the source file to be hosted at the advertising listing provider system. In addition, as described above, more than two different display formats may be possible and in such embodiment, one or more additional sections or additional pages may be provided to enable the advertiser to specify inputs and contents of the various additional display formats to which the advertisement may morph depending upon user initiated activity.

Morphing and Menu-Driven Advertisements in Pay-for-Performance Advertising

In various embodiments, the morphing advertisements may be part of a pay-for-performance-based advertising system in which ranking of advertisements may be based on one or more price parameters and/or one or more performance parameters (e.g., click through rate, conversion rate, performance information, page real estate, other measure of performance, etc.). Specific examples include, but are not limited to, bid amount for click-through, efficiency rating a combination thereof. Accordingly, in such embodiments use of any ranking system may be used within the scope of the present invention.

For ranking, an effective rank of the graphic may be determined. The effective rank may be based on the price parameter (e.g., the cost per click, etc.) and the performance parameter (e.g., click through rate, etc.). According to an example, the effective rank may be determined by multiplying the cost per click and the click through rate. In one example, a higher graphical advertisement's CPC or CTR results in a higher graphical advertisement position. Because this ranking system rewards well-targeted, relevant advertisements, an advertiser cannot be locked out of the top position as an advertiser would in a ranking system based solely on price. If an advertisement is irrelevant, end-users are less likely to click on the advertisement thereby forcing the advertisement to move down the page. Similarly, if an advertisement is relevant, it is likely to rise to the top without additional payment from the advertiser. Additional examples of ordering advertisement using scores where the scores may be determined using, at least one of accepted advertisement price information and advertisement performance information are discussed in U.S. patent application Ser. No. 10/445,376, filed on May 23, 2003, entitled "Scoring, Modifying Scores of, and/or Filtering Advertisements Using Advertiser Information," which is incorporated by reference herein in its entirety. The score may be determined (or adjusted) using, at least, advertiser information. In addition, advertiser information may be used to filter out advertisements. Additional examples of ordering advertisements in a manner that maximizes relevance and economic values are discussed in U.S. patent application Ser. No. 10/112,656, filed on Mar. 29, 2002, entitled "Methods and Apparatus for Ordering Advertisements Based on Performance Information" and U.S. patent application Ser. No. 10/112,654, filed on Mar. 29, 2002, entitled "Methods and Apparatus for Ordering Advertisements Based on Performance Information and Price Information," which are incorporated by reference herein in their entirety. Advertisement ordering may be based on accepted advertisement price information and/or advertisement performance information where price information and/or performance information may be weighted or otherwise adjusted.

In another example, the advertiser may specify a maximum cost per click amount as well as a daily budget. The daily budget may represent how much an advertiser wants to spend per month (or other time frame) divided by the number of days in that month (or other time frame). The server may use this data to match a daily amount to help ensure maximum advertisement exposure evenly throughout each day (or other time period). Additional examples of governing the serving (or delivery) of advertisements based on some cost target, such as cost budget for a given period of time, are discussed in U.S. patent application Ser. No. 10/340,553, filed on Jan. 10, 2003, entitled "Governing the Serving of Advertisements Based on a Cost Target," which is incorporated by reference herein in its entirety. Advertisers may budget their advertising expenditures, while allowing an ad serving entity to maximize its revenue subject to advertisers' budget constraint(s). For example, an exemplary embodiment may estimate an expected cost if an ad were subject to no budgetary constraints and govern the serving of the advertisement based on the expected cost and the budget constraint(s).

An advertiser may specify content-based concepts (e.g., keywords, subject matter, etc.) and a price parameter (e.g., a maximum amount an advertiser is willing to pay for each click) where the advertiser pays only when an end-user clicks on the graphical advertisement. Additional costs may be saved by automatically reducing the actual CPC to a lowest cost needed to maintain the graphical advertisement's position on the results page (e.g., content page, search results page, etc.).

Additional examples of presenting advertisements and managing advertising costs are discussed in U.S. patent application Ser. No. 10/340,543, filed on Jan. 10, 2003, entitled "Automated Price Maintenance for Use With a System in which Advertisements are Rendered with Relative Preferences" and U.S. patent application Ser. No. 10/340,542, filed Jan. 10, 2003, entitled "Automated Price Maintenance for Use With a System in Which Advertisements are Rendered with Relative Preference Based on Performance Information and Price Information," which are incorporated by reference herein in their entirety. Advertisements may be ordered based on accepted maximum ad bid information, or a combination of maximum ad bid information and ad performance information. For example, this information may be used to determine a position (or some other ad preference) value. Cost may be determined based on the accepted maximum ad bid information and the next lower position value. Certain days or time frames may be targeted for increased exposure. For example, during the holiday season, an advertiser may be willing to spend more on advertisement to increase exposure. In addition, peak Internet usage times may also trigger additional advertisement exposure. Additional examples of determining and using time information (e.g., end user local time information, including local time-of-day, local day-of-week, local date, and/or local season information, etc.) for improving usefulness and performance of advertisements are discussed in U.S. patent application Ser. No. 10/676,369, filed on Oct. 1, 2003, entitled "Determining and/or Using End User Local Time Information in an Ad System," which is incorporated by reference herein in its entirety.

Real-Estate-Based Price Parameters with or without Morphing

Also, advertisers may be given the opportunity to have their ad expand to exclude some or all other ads or simply to cover the other ads in initial presentation (without morphing). Typically, advertisements in a more compact format are set off from the rest of the web page on which they reside (see, e.g., FIG. 1). Given the finite amount of space for such advertisements, advertisers may be given the opportunity to exclude other advertisements and thereby gain additional space for their particular advertisement by expanding to cover those advertisements. This may be an option or a standard feature in certain advertisement formats.

From the advertisement listing provider's perspective, the ability to exclude other advertisements is desirable if the expected revenue and user experience (possibly including goodwill as a bonus) incurred by doing so is maximal, based on statistical observation from morph requests (i.e., clicks on expand icons appearing on advertisements in compact form) and performance (e.g., click-through information and/or conversion information).

Advertisers may be permitted to:
i) Enter a "bid to be the only advertiser" mode. As in ii.) below, eliminates all competing advertisements.
ii) Enter a "bid to exclude enough other advertisers to show a particular size advertisement."

In each of these cases, the winning advertiser may pay the price parameter for the top spot plus an amount to exclude other advertisements. By way of non-limiting example, there may be three eligible advertisers (i.e., space for three advertisement spots) with a particular size advertisement. The advertisement spots may be ordered based on pure price parameter value, pay-for-placement ranking, an efficiency basis, or a fixed-price basis (such as impression or CIP or cost per thousand impressions or CPM), just to name a few methods of initial selection of the three ads. Using latter example of CPI rankings, the top advertisement spot costs Z, the middle costs Y, and the bottom costs Z. The winning (top) advertiser can expand to use the space used by the bottom advertiser by paying the cost of the top spot plus the cost of the bottom spot plus some premium (i.e., X+Z+epsilon, where epsilon is the premium). The top advertiser can use the entire space if they are willing to pay the cost of all three spots plus some (possibly different) premium (X+Y+Z+epsilon', where epsilon' is the premium for this case). This effective cost per impression or eCPI may be factored into click cost as: cost of click=eCPI/CTR. In another example, payment is based on effective revenue per impression.

Note that both schemas i) and ii) are revenue-neutral (plus the premium) for the advertising listing provider (i.e., advertisement host), and puts the cost for exclusive placement on the winning advertiser, at a rate set by the market.

An additional illustrative example, the system may want to incentivize advertisers to utilize the morphing advertisement. Specifically, the advertising listing provider may believe that the utilization of a morphing advertisement is more likely to generate a click through by the user, and thus revenue to the advertisement listing provider. In such systems, the advertising listing provider is paid an amount based on a price parameter specified by the advertiser when the advertisement achieves some performance parameter (e.g., an end user clicks through to the advertiser designated sources). Accordingly, the advertising listing provider increases its revenue based on two criteria: the amount of the price parameter specified by an advertiser (e.g., bid amount) and the performance of the advertisement (e.g., click-through-rate, conversion rate, etc.). Accordingly, as the performance and price parameters increase, the advertising listing provider makes more money. Thus, this explains the basis for an advertising listing provider utilizing an effective rate based on a price parameter and a performance parameter, such as an effective click through rate as the basis for ranking advertisements and the system for giving key word, contents, and/or combination thereof.

When a new advertisement type of system such as described above is implemented, however, users may not be accustomed to interfacing with such an advertisement. Therefore, there may be some degradation in the click through rate for a given advertiser until the users gets accustomed to utilizing the morphing advertisements. Over time, however, the users of the system become more accustomed to using a morphing advertisement and because of the increased value of the additional information provided, the effective click through rate could go up. During the mean time, however, an advertiser's ranking may drop due to the decreased click through rate. Therefore, to compensate for this potential intervening drop and click through rate, the system may give a credit or bonus to advertisers who utilize a morphing advertisement.

For example, if an advertiser's specific price in a price parameter for a given concept (e.g., content, keyword or combination thereof) were 20 cents per some level of performance (e.g., click through, conversion, etc.), the system may provide a 20% bonus to the advertiser for utilizing a morphing advertisement. Accordingly, the advertisement would be treated as being based on a 22 cent click through bid as opposed to 20 cents. Or, rather than increasing the bid amount for using morphing ads, the recorded click through rate for that advertiser could be artificially modified by a certain percentage as well. Or, the click through rate calculations could be increased based upon various criteria of use of the morphing advertisement rather than just a click through rate. In this example, the advertiser may not be charged for a click through even though the click through rate would be increased for purposes of ranking. For example, if a particular advertisement had a click through rate of 100 per 1000 impressions, but the system determined that for every 1000 impressions, 200 users expanded the advertisement from a first display format to a second display format, the system could adjust the click through rate from 100 per thousand to 300 per thousand or any level of adjustment in between based on assessment or a scheme employed by the system. This increase could be for purposes of ranking but not compensation to the advertising listing provider, or for both or a two for one increase may be in order such that the click through rate would be adjusted to 200 per thousand. In this example, the advertiser could be charged for the additional click throughs based on the user's expansion, but preferably the adjustment would be only for purposes of ranking and not for purposes of accounting the amount owed by the advertiser to the advertiser listing system. But the adjustment could be made for both.

The bonus or credit system may be implemented only for a pre-determined period of time until the morphing advertisement system becomes accepted by end users or until a predetermined number of advertisers transition their advertisements in the system from a single display format to a morphing advertisement format. Other methodologies for enticing advertisers to employ morphing advertisements something else will be used within the scope of the present invention.

As discussed briefly above, the system may desire to track the utilization of the morphing advertisement for purposes of accounting or feedback to the advertisers. Accordingly, the code delivered with the advertisement may include code to track actions by a user, including one or more of the following: expansion of an ad from a first display format to a second display format (or other formats if available), selection of menu options, selection of the home icon, time spent viewing each iteration of the advertisement (i.e., time spent viewing the first display format and time spent viewing the second display format), mouse-over events, shrinking the advertisement, etc. This information may then be transmitted back to the content advertisement system to provide feedback, research information, and for billing purposes.

According to another variation on use of the system, an advertiser may be charged a "click through" based on tracking of the user activity. As discussed above, the click through could be charged even if the user does not actually click through to the advertiser's web site. For example, if an advertiser does not have a web site, the advertiser could still participate in the system by agreeing that expansion of the advertisement from a first display format to a second display format would be deemed a billable event, that a predetermined amount of time viewing the second display format comprised a billable event, that selection of any of the menu options comprised a click through, or any other basis for tracking the use of the morphing advertisement by a user. In such a way, an advertiser that does not have a web site could still participate in a pay for performance advertisement system by filling out information such as that depicted in FIG. 11 and having a relatively useful graphical interface by which potential customers can learn more about the advertiser and/or its products. Also, even if the company that is advertising does have its own website, the advertising listing system may decide to charge a billable event if an end user performs a certain predetermined number of activities with regard to the morphing ad, views the second display format for a predetermined period of time, selects one or more of the menu options, or any other basis for charging for a click through. It should be understood that charging is optional by the system but in various iterations of this system, charging based on activities other than a click through could be executed by the system.

In another example, one or more morphing advertisements may be associated with an ad group involving a group of advertisements. For example, the group of advertisements may include non-graphical, text-only or other advertisements associated with the same (or related) advertiser that created the morphing advertisement. Other methods for grouping advertisements may be applied. This ad group may be triggered using common criteria (e.g., the same (or related) keywords, subject matter or concepts, etc.). An advertiser may use a single interface to manage various advertisements (e.g., text-only advertisements, graphical advertisements, other rich media advertisements including audio and/or visual information, and other advertisements). Additional examples of managing online advertising by associating two or more keywords with an advertisement and associating a bid, collectively, with the two or more keywords are discussed in U.S. patent application Ser. No. 10/340,193, filed on Jan. 10, 2003, entitled "Pricing Across Keywords Associated with One or More Advertisements," which is incorporated by reference herein in its entirety.

While the foregoing description includes details and specificities, it should be understood that such details and specificities have been included for the purposes of explanation only, and are not to be interpreted as limitations of the present invention. Many modifications to the embodiments described above can be made without departing from the spirit and scope of the invention, as it is intended to be encompassed by the following claims and their legal equivalents.

What is claimed is:

1. A system, comprising:
  a database server to perform operations comprising:
    storing a plurality of electronic advertisements; and
  one or more servers to perform operations comprising:
    receiving, from a publisher, a request for an advertisement to be included in a first electronic document associated with the publisher on a first website;
    identifying an electronic advertisement responsive to the request, the electronic advertisement including a menu item having a reference to a network location of a second electronic document on a different second website;
    delivering, at a first time, the electronic advertisement to be included in the first electronic document;
    receiving an indication of a user selection of the menu item of the electronic advertisement; and
    delivering, at a second later time, the electronic advertisement including the menu item to the network location of the second electronic document on the different second website to be included within content of the second electronic document retrieved from the different second website.

2. A computer-readable storage device having stored thereon instructions, which, when executed by a computer, cause the computer to perform operations comprising:
  receiving, from a publisher, a request for an advertisement to be included in a first electronic document associated with the publisher on a first website;
  identifying an electronic advertisement responsive to the request, the electronic advertisement including a menu item having a reference to a network location of a second electronic document on a different second website;
  delivering, at a first time, the electronic advertisement to be included in the first electronic document;
  receiving a user selection of the menu item of the electronic advertisement; and
  delivering, at a second later time, the electronic advertisement including the menu item to the network location of the second electronic document on the different second website to be included within content of the second electronic document retrieved from the different second website.

3. A system comprising:
  a database server to perform operations comprising:
    storing a plurality of electronic advertisements; and
  one or more servers to perform operations comprising:
    identifying an electronic advertisement, the electronic advertisement including a reference to a network location associated with a second electronic document on a second website;
    delivering, at a first time, a first electronic document on a first website including the electronic advertisement within content of the first electronic document on the first website, wherein the first website is different from the second website;
    receiving a user selection of the reference to the network location included in the electronic advertisement; and
    delivering, at a second later time, the electronic advertisement to be included within content of the second electronic document retrieved from the different second website.

4. A computer-readable storage device having stored thereon instructions, which, when executed by a computer, cause the computer to perform operations comprising:
  identifying an electronic advertisement, the electronic advertisement including a reference to a network location associated with a second electronic document on a second website;
  delivering, at a first time, a first electronic document on a first website including the electronic advertisement within content of the first electronic document on the first website, wherein the first website is different from the second website;
  receiving a user selection of the reference to the network location included in the electronic advertisement; and
  delivering, at a second later time, the electronic advertisement to be included within content of the second electronic document retrieved from the different second website.

5. The system of claim 1, wherein the electronic advertisement comprises a menu-driven advertisement comprising a compact display format, an expanded display format, and a control element to transition between the compact display format and the expanded display format.

6. The system of claim 1, wherein the second electronic document comprises a web page from an advertiser's web site.

7. The system of claim 1, wherein delivering, at a second later time, the electronic advertisement including the menu item to the network location of the second electronic document on the different second website comprises delivering the second electronic document including the electronic advertisement.

8. The system of claim 1, wherein the content of the first electronic document is hosted by a different entity than the content of the second electronic document.

9. The computer-readable storage device of claim 2, wherein the electronic advertisement comprises a menu-driven advertisement comprising a compact display format, an expanded display format, and a control element to transition between the compact display format and the expanded display format.

10. The computer-readable storage device of claim 2, wherein the second electronic document comprises a web page from an advertiser's web site that is different from the first web site.

11. The computer-readable storage device of claim 2, wherein delivering, at a second later time, the electronic advertisement including the menu item to the network location of the second electronic document on the different second website comprises delivering the second electronic document including the electronic advertisement.

12. The computer-readable storage device of claim 2, wherein the content of the first electronic document is hosted by a different entity than the content of the second electronic document.

13. The system of claim 3, wherein the electronic advertisement comprises a menu-driven advertisement comprising a compact display format, an expanded display format, and a control element to transition between the compact display format and the expanded display format.

14. The system of claim 3, wherein the second electronic document comprises a web page from an advertiser's web site that is different from the first web site.

15. The system of claim 3, wherein delivering, at a second later time, the electronic advertisement to be included within content of the second electronic document retrieved form the different second website comprises delivering the second electronic document including the electronic advertisement.

16. The system of claim 3, wherein the content of the first electronic document is hosted by a different entity than the content of the second electronic document.

17. The computer-readable storage device of claim 4, wherein the electronic advertisement comprises a menu-driven advertisement comprising a compact display format, an expanded display format, and a control element to transition between the compact display format and the expanded display format.

18. The computer-readable storage device of claim 4, wherein the second electronic document comprises a web page from an advertiser's web site.

19. The computer-readable storage device of claim 4, wherein delivering, at a second later time, the electronic advertisement to be included within content of the second electronic document retrieved from the different second website comprises delivering the second electronic document including the electronic advertisement.

20. The computer-readable storage device of claim 4, wherein the content of the first electronic document is hosted by a different entity than the content of the second electronic document.

21. A computer-implemented method comprising:
receiving, from a publisher, a request for an advertisement to be included in a first electronic document associated with the publisher on a first website;
identifying an electronic advertisement responsive to the request, the electronic advertisement including a menu item having a reference to a network location of a second electronic document on a different second website;
delivering, at a first time, the electronic advertisement to be included in the first electronic document;
receiving an indication of user selection of the menu item of the electronic advertisement; and
delivering, at a second later time, the electronic advertisement including the menu item to the network location of the second electronic document on the different second website to be included within content of the second electronic document retrieved from the different second website.

22. The method of claim 21, wherein the electronic advertisement comprises a menu-driven advertisement comprising a compact display format, an expanded display format, and a control element to transition between the compact display format and the expanded display format.

23. The method of claim 21, wherein the second electronic document comprises a web page from an advertiser's web site.

24. The method of claim 21, where delivering, at a second later time, the electronic advertisement including the menu item to the network location of the second electronic document on the different second website comprises delivering the second electronic document including the electronic advertisement.

25. The method of claim 21, wherein the content of the first electronic document is hosted by a different entity than the content of the second electronic document.

26. A computer-implemented method comprising:
identifying an electronic advertisement, the electronic advertisement including a reference to a network location of a web page on a first website;
delivering, at a first time, an electronic document on a second website including the electronic advertisement within content of the electronic document on the second website, wherein the first website is different from the second website;
receiving a user selection of the reference to the network location included in the electronic advertisement; and
delivering, at a second later time, the electronic advertisement to be included within content of the web page retrieved from the first website that is different from the second website.

27. The method of claim 26, wherein the electronic advertisement comprises a menu-driven advertisement comprising a compact display format, an expanded display format, and a control element to transition between the compact display format and the expanded display format.

28. The method of claim 26, wherein the web page comprises a web page from an advertiser's web site.

29. The method of claim 26, where delivering, at a second later time, the electronic advertisement to be included within content of the web page retrieved from the first website that is different from the second website comprises delivering the web page including the electronic advertisement.

30. The method of claim 26, wherein the electronic document is hosted by a different entity than the web page.

* * * * *